United States Patent
Shaikh et al.

(10) Patent No.: US 9,948,606 B2
(45) Date of Patent: Apr. 17, 2018

(54) ENHANCING PRIVACY AND SECURITY ON A SDN NETWORK USING SDN FLOW BASED FORWARDING CONTROL

(71) Applicants: Nazneen Shaikh, Bangalore (IN); Murali Krishnan, Bangalore (IN); Girish Gulawani, Bangalore (IN)

(72) Inventors: Nazneen Shaikh, Bangalore (IN); Murali Krishnan, Bangalore (IN); Girish Gulawani, Bangalore (IN)

(73) Assignee: KN Group, GHQ (IE)

( * ) Notice: Subject to any disclaimer, the term of this patent is extended or adjusted under 35 U.S.C. 154(b) by 121 days.

(21) Appl. No.: 15/179,726

(22) Filed: Jun. 10, 2016

(65) Prior Publication Data
US 2017/0187686 A1 Jun. 29, 2017

Related U.S. Application Data

(63) Continuation-in-part of application No. 15/142,748, filed on Apr. 29, 2016.

(30) Foreign Application Priority Data

Dec. 25, 2015 (IN) .......................... 4857/MUM/2015

(51) Int. Cl.
*H04L 29/06* (2006.01)
*H04L 12/24* (2006.01)

(52) U.S. Cl.
CPC ...... *H04L 63/0263* (2013.01); *H04L 41/5074* (2013.01); *H04L 63/10* (2013.01); *H04L 63/1408* (2013.01); *H04L 63/20* (2013.01)

(58) Field of Classification Search
CPC ......... H04L 29/00; H04L 29/06; H04L 29/12; H04L 9/00; H04L 9/32; H04L 43/16;
(Continued)

(56) References Cited

U.S. PATENT DOCUMENTS

2014/0317261 A1 10/2014 Shatzkamer
2015/0139238 A1* 5/2015 Pourzandi ............... H04L 45/42
370/392

(Continued)

FOREIGN PATENT DOCUMENTS

WO 2015/071888 A1 5/2015

OTHER PUBLICATIONS

International Search Report for Application No. PCT/EP2016/081921 dated Mar. 17, 2017.

*Primary Examiner* — Mohamed Kamara
(74) *Attorney, Agent, or Firm* — Tarolli, Sundheim, Covell & Tummino LLP

(57) ABSTRACT

A computer implemented method for providing security on a software defined network (SDN). The method comprises providing a master SDN controller for managing data flow control on the SDN network. Requesting access to a uniform resource locator (URL) from a requesting networked device. Initiating a domain name system (DNS) interaction with the requesting networked device. Relaying by the DNS data associated with the requested URL to a threat management control system (TMCS). Determining by the TMCS if the requested URL has an associated security criteria. Communicating a threat status by the TMCS to the SDN co-controller associated with the requesting networked device.

44 Claims, 26 Drawing Sheets

(58) Field of Classification Search
CPC ... H04L 43/0894; H04L 45/124; H04L 63/00; H04L 63/02; H04L 63/0263; H04L 63/10; H04L 63/1408; H04L 63/20; H04L 63/1416; H04L 63/104; H04L 63/0281; H04L 63/1458; H04L 47/32
See application file for complete search history.

(56) References Cited

U.S. PATENT DOCUMENTS

| | | | |
|---|---|---|---|
| 2015/0200859 A1* | 7/2015 | Li | H04L 41/0823 370/235 |
| 2016/0036837 A1* | 2/2016 | Jain | H04L 63/1416 726/23 |
| 2017/0041427 A1* | 2/2017 | Dhawan | H04L 67/2852 |
| 2017/0187607 A1* | 6/2017 | Shaikh | H04L 45/02 |

* cited by examiner

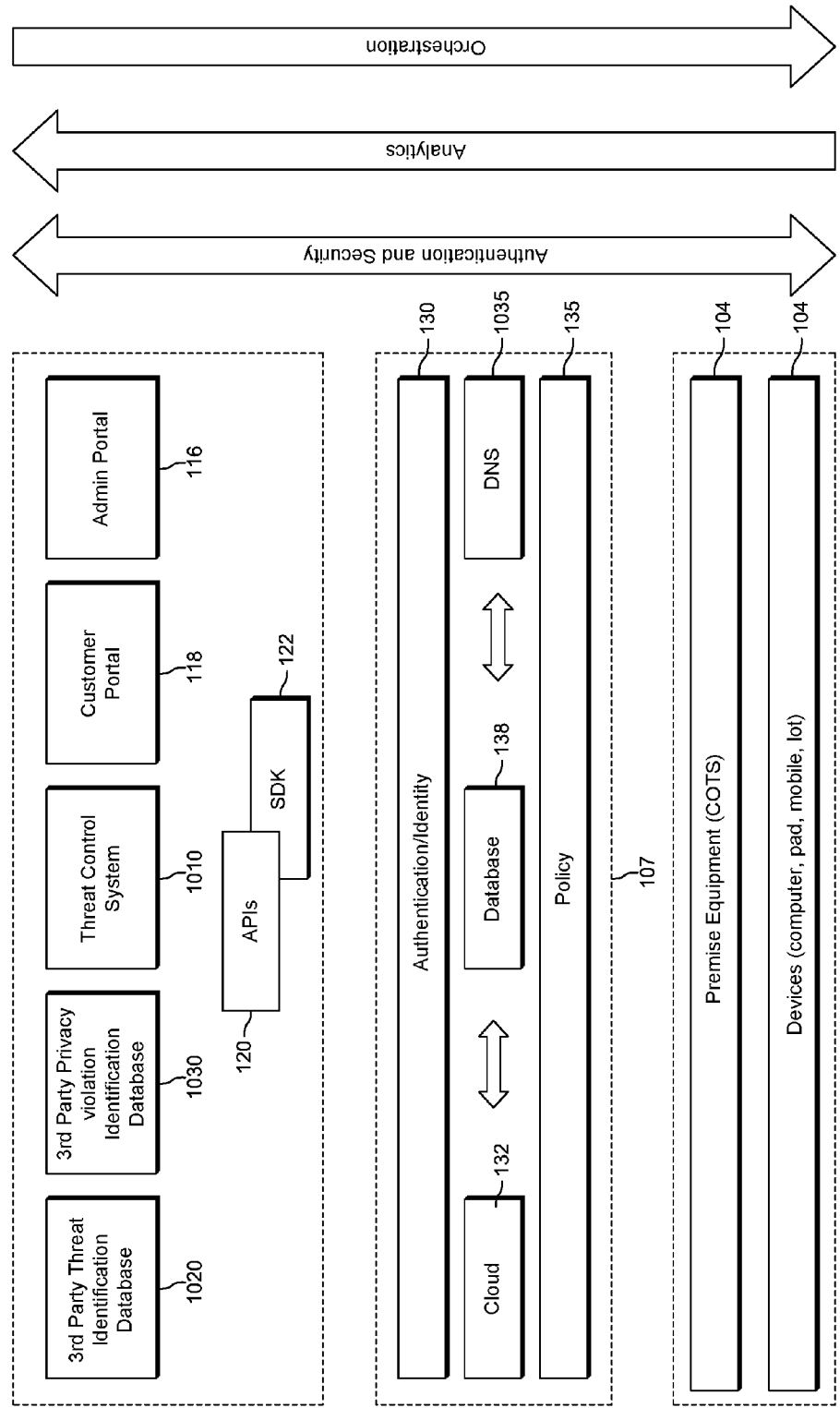

ENHANCING PRIVACY AND SECURITY ON A SDN NETWORK USING SDN FLOW BASED FORWARDING CONTROL

RELATED APPLICATION

This application is a Continuation-in-Part of U.S. patent application Ser. No. 15/142,748, filed Apr. 29, 2016, the subject matter of which are incorporated herein by reference in their entirety.

FIELD OF THE INVENTION

This present disclosure relates to orchestrated privacy and threat management and control using SDN flow based forwarding control. In particular, but not exclusively, the disclosure relates to an SDN platform and related architecture.

BACKGROUND

Many applications have been created to breach security on a network, to do damage to another parties connectivity or systems, to steal data, to threaten or block systems and to invade the privacy of others. Their evolution started soon after the beginning of the computer age and include multiple types of viruses, malware, adware, trojans, denial of service (DOS), distributed DOS, spyware, etc.

In addition the shifting business models of companies now means that when a customer purchases a software product or even uses what is considered to be legitimate software that this permits both legitimate and nefarious companies to gather very significant amounts of personal data on the user. The consumer is generally unaware of the level of tracking and monitoring taking place by what they consider to be legitimate products because the consumer has inadvertently agreed to terms and conditions which may not be valid under their local country regulations where they reside.

Most of these security breach and privacy violation developments are being used for some form of malicious purpose on a varying scale. The evolving and changing problems faced by the consumer in relation to both security violation and privacy violation can be considered against the historic way viruses evolved. Some years ago it was obvious when a virus infection was present. The viruses of the past were largely written by amateurs and tended to be obvious, in that they exhibited destructive behaviour or pop-ups. Modern viruses however, are often written by professionals and are financed by nefarious organizations. With this levels of nefarious activities being experienced by end users a new approach is required to address security and privacy concerns for end users.

There is therefore a need for a method for providing security on a software defined network (SDN) which addresses at least some of the drawbacks of the prior art. Additionally, their is a need a network security controller which also overcomes at least some the drawbacks of the prior art.

SUMMARY

The present disclosures enables security threats and privacy violations to be addressed by leveraging the programmability of flow control on SDN devices to identify and to not forward identified traffic which contain threats or privacy violations. Flow based forwarding is programmed on the end user device to limit the forwarding of threat traffic or privacy violation traffic.

Accordingly, the present disclosure relates to a computer implemented method for providing security on a software defined network (SDN); the method comprising:

providing a master SDN controller for managing data flow control on the SDN network; the master SDN controller being operable to generate routing data for the networked devices;

generating by the master SDN controller a plurality of discrete co-controllers each associated with a particular end user; each SDN co-controller including routing data for an associated networked device;

dispatching the SDN co-controller by the master SDN controller to the networked devices associated with the respective end users for controlling thereof;

requesting access to a destination on the SDN network from a requesting networked device;

initiating a domain name system (DNS) interaction with the requesting networked device;

relaying by the DNS data associated with the requested destination to a threat management control system (TMCS);

determining by the TMCS if the requested destination has an associated security criteria;

communicating a threat status by the TMCS to the SDN co-controller associated with the requesting networked device; and generating routing data by the SDN co-controller associated with the requesting networked device based on the threat status to allow or deny access to the requested destination.

Additionally, the present disclosure relates to a computer implemented method for providing security on a software defined network (SDN); the method comprising:

providing a master SDN controller for managing data flow control on the SDN network; the master SDN controller being operable to generate routing data for the networked devices;

generating by the master SDN controller a plurality of discrete co-controllers each associated with a particular end user; each SDN co-controller including routing data for an associated networked device;

dispatching the SDN co-controller by the master SDN controller to the networked devices associated with the respective end users for controlling thereof;

requesting access to a uniform resource locator (URL) from a requesting networked device;

initiating a domain name system (DNS) interaction with the requesting networked device;

relaying by the DNS data associated with the requested URL to a threat management control system (TMCS);

determining by the TMCS if the requested URL has an associated security criteria;

communicating a threat status by the TMCS to the SDN co-controller associated with the requesting networked device; and generating routing data by the SDN co-controller associated with the requesting networked device based on the threat status to allow or deny access to the requested URL.

In one aspect, the TMCS is in communication with at least one data repository that contain details of URLs which have predetermined security criteria associated with them.

In another aspect, the at least one data repository is updated once an URL becomes known as having a malicious security criteria.

In a further aspect, the at least one data repository is hosted by a third party entity. Advantageously, the at least one data respository comprises a classification of multiple risk types. In one example, the at least one data respository comprises a classification of multiple user profiles. Preferably, each user profile has an associated routing action based on it's classification. In an exemplary arrangement, the at least one data respository comprises a first data set associated with destinations having pre-identified security threats. In a futher example, the at least one data repository comprises a second data set associated with destinations that are known to harvest privacy related data from users.

In one aspect, the first data set is stored in a first data repository; and the second data set is stored in a second data repository.

In another aspect, each SDN co-controlled has an associated security match module which is operable to define an appropriate forwarding decision based on the threat status recieved from the TMCS. In one example, the fowarding decision is based on a user profile associated with the requesting networked device. In another aspect, the forwarding decision is based on a risk classification. Advantageously, the forwarding decision results in traffic being sent to a quarantine destination. In one example, forwarding decision results in traffic being forwarded to the requested URL.

In a further aspect, the SDN co-controlled on the requesting networked device enter a forwarding entry in a flow routing table based on the forwarding decision of security match module.

In one aspect, the TMCS is operable to populate an open database accessible by an SDN orchestrator. Advantageously, the TMCS is operable to populate the open database with the status of identified threats.

In another aspect, the open database is accessible from at least one remote portal. Advantageously, the status of the identified threats are viewable from the at least one remote portal.

In a further aspect, the TMCS is operable to relay an IP address of a user; a user profile identifier and a risk classification identifier to the open database. Advantageously, the IP address of the user is used to to map a security alert report to a customer record. In one aspect, the security alert report details actions required to be taken by the user to alleviate the threat.

In another aspect, the user selects a security setting from a plurality of available security settings. Advantageously, a security policy is generated based on the selected security setting. In one aspect, an identifier of the requesting networked device is extracted from the open database. Preferably, a list of commonly used sites by the user are extracted from the open database.

In a further aspect, the method further comprises extracting analytical data by the SDN co-controllers from the networked devices. Advantageously, the method includes routing the extracted analytical data to an open database.

In one aspect, the extracted analytical data is routed by the SDN co-controllers to the open database via the master SDN controller.

In a further aspect, an analytics engine is in communication with the open database being operable to analyse the extracted analytics to generate an analytics output.

In a another aspect, the analytics output is accessible via one or more client portals.

In one exemplary arrangement, one or more performance enhancing options are made available to the end user via the client portals for selection based on the analytics output.

Advantageously, configuration data is updated in response to the end user selecting one or more performance enhancing options.

In one aspect, the method further comprises updating the installed SDN co-controller with the updated configuration data for modifying operational configuration of the networked devices.

In another aspect, the operational configuration of the networked devices are modified to increase a quality of service parameter. Advantageously, the operational settings of the networked devices are updated in real-time while being online. In one example, the operational configuration of the networked devices are updated while in a sleep-mode.

In a further example, the SDN co-controllers are installed on a system on chip (SOC) of the respective networked devices. Advantageously, the SDN co-controllers are loaded to firmware contained on the respective networked devices. In an exemplary aspect, the SDN co-controllers are binary deployable.

In one aspect, the SDN co-controllers register with the master SDN controller after being installed on the respective networked devices for controlling the routing of data from the networked devices and for controlling the configuration of the networked devices.

The present disclosure also relates to a network security controller for a software defined network (SDN), the network security controller comprising one or more modules operable to:

provide a master SDN controller for managing data flow control on the SDN network; the master SDN controller being operable to generate routing data for the networked devices;

generate by the master SDN controller a plurality of discrete co-controllers each associated with a particular end user; each SDN co-controller including routing data for an associated networked device;

dispatch the SDN co-controller by the master SDN controller to the networked devices associated with the respective end users for controlling thereof;

request access to a uniform resource locator (URL) from a requesting networked device;

initiate a domain name system (DNS) interaction with the requesting networked device;

relay by the DNS data associated with the requested URL to a threat management control system (TMCS);

determine by the TMCS if the requested URL has an associated security criteria;

communicate a threat status by the TMCS to the SDN co-controller associated with the requesting networked device; and generate routing data by the SDN co-controller associated with the requesting networked device based on the threat status to allow or deny access to the requested URL.

Additionally, the present disclosure relates to a computer-readable medium comprising non-transitory instructions which, when executed, cause a processor to carry out a method according to any one of steps as previously described. For example; the non-transitory instructions which, when executed, cause a processor to carry out a method comprising:

providing a master SDN controller for managing data flow control on the SDN network; the master SDN controller being operable to generate routing data for the networked devices;

generating by the master SDN controller a plurality of discrete co-controllers each associated with a particular end user; each SDN co-controller including routing data for an associated networked device;

dispatching the SDN co-controller by the master SDN controller to the networked devices associated with the respective end users for controlling thereof;

requesting access to a uniform resource locator (URL) from a requesting networked device;

initiating a domain name system (DNS) interaction with the requesting networked device;

relaying by the DNS data associated with the requested URL to a threat management control system (TMCS);

determining by the TMCS if the requested URL has an associated security criteria;

communicating a threat status by the TMCS to the SDN co-controller associated with the requesting networked device; and generating routing data by the SDN co-controller associated with the requesting networked device based on the threat status to allow or deny access to the requested URL.

In one aspect there is provided a computer implemented method for controlling a software defined network (SDN); the method comprising:

providing one or more client portals which are configured for facilitating users controlling networked devices;

generating configuration data based on input received from users via the client portals;

providing a master SDN controller for managing data flow control on the SDN network; the master SDN controller being operable to generate routing data for the networked devices;

generating by the master SDN controller a plurality of discrete co-controllers each associated with a particular end user; each SDN co-controller including configuration data and routing data for an associated networked device;

dispatching the SDN co-controller by the master SDN controller to the networked devices associated with the respective end users for controlling thereof;

installing the SDN co-controllers on the networked devices; and registering the installed SDN co-controllers with the master SDN controller for controlling the routing of data from the networked devices and for controlling the configuration of the networked devices.

The present disclosure also relates to a computer implemented method for providing security and privacy on a software defined network (SDN); the method comprising:

providing a master SDN controller for managing data flow control on the SDN network; the master SDN controller being operable to generate routing data for the networked devices;

generating by the master SDN controller a plurality of discrete co-controllers each associated with a particular end user; each SDN co-controller including routing data for an associated networked device;

dispatching the SDN co-controller by the master SDN controller to the networked devices associated with the respective end users for controlling thereof;

requesting access to a destination on the SDN network from a requesting networked device;

In a further aspect, the operational configuration of the networked devices are updated by changing to an alternative communication channel to avoid cross-talk from neighbouring devices.

In one aspect, the communication channel includes a WIFI channel.

In a further aspect, the operational configuration of the networked device is changed to reduce power consumption.

In one aspect, the operation configuration of the networked device is changed by reprogramming a power interface.

In another aspect, the operational configuration of the networked device is changed to increase priority to available bandwidth.

In one aspect, the operational configuration of the networked device is changed to decrease priority to available bandwidth.

In a further aspect, the SDN co-controllers are operable for assigning a first priority setting to a first set of network devices and assigning a second priority setting a second set of network devices.

In one aspect, the first priority setting is associated with a first bandwidth limit, and the second priority setting is associated with a second bandwidth limit.

In another aspect, the master SDN contoller implements SDN orchestration in response to a resource request received on the client portals. Advantageously, SDN orchestration includes coordinating the required networking hardware and software elements to support applications associated with the resource request. Preferably, SDN orchestration includes generating an instance of one or more applications in the cloud. In one example, SDN orchestration generates a network-function virtualisation (NFV) instance.

In one aspect, a user profile is generated for each end user.

In another aspect, a user is authenticated.

In one exemplary aspect, the SDN co-controllers are installed on a system on chip (SOC) of the respective networked devices.

In another aspect, the SDN co-controllers are loaded to firmware contained on the respective networked devices.

In a further aspect, the SDN co-controllers are binary deployable.

In one aspect, the master SDN controller generates a configuration file for each resource selected by the end user on the client portal.

In a further aspect, the SDN co-controllers are dispatched to an in-home network for the gathering of transport protocol related information.

In one aspect, the networked devices are compatible with at least one of Data Over Cable Service Interface Specification (DOCSIS), Fiber to the X (FTTx), xDSL, Asymmetric digital subscriber line (DSL), and Wi-Fi.

In another aspect, the client portals are web based interfaces.

The present teaching also relates to a network controller for a software defined network (SDN), the network controller comprising one or more modules operable to:

provide one or more client portals which are configured for facilitating users controlling networked devices;

generate configuration data based on input received from users via the client portals;

provide a master SDN controller for managing data flow control on the SDN network; the master SDN controller being operable to generate routing data for the networked devices;

generate by the master SDN controller a plurality of discrete co-controllers each associated with a particular end user; each SDN co-controller including configuration data and routing data for an associated networked device;

dispatch the SDN co-controller by the master SDN controller to the networked devices associated with the respective end users for controlling thereof;

install the SDN co-controller on the networked devices; and register the installed SDN co-controllers with the master SDN controller for controlling the routing of data from the networked devices and for controlling the configuration of the networked devices.

Furthermore, the present disclosure relates an article of manufacture comprising a processor-readable medium having embodied therein executable program code that when executed by the processing device causes the processing device to perform:

providing one or more client portals which are configured for facilitating users controlling networked devices;

generating configuration data based on input received from users via the client portals;

providing a master SDN controller for managing data flow control on the SDN network; the master SDN controller being operable to generate routing data for the networked devices;

generating by the master SDN controller a plurality of discrete co-controllers each associated with a particular end user; each SDN co-controller including configuration data and routing data for an associated networked device;

dispatching the SDN co-controller by the master SDN controller to the networked devices associated with the respective end users for controlling thereof;

installing the SDN co-controller on the networked devices; and registering the installed SDN co-controllers with the master SDN controller for controlling the routing of data from the networked devices and for controlling the configuration of the networked devices.

Additionally, the present teaching relates to a software defined network (SDN); the method comprising:

providing one or more client portals which are configured for facilitating users controlling networked devices;

generating configuration data based on input received from users via the client portals;

providing a master SDN controller for managing data flow control on the SDN network; the master SDN controller being operable to generate routing data for the networked devices;

generating by the master SDN controller a plurality of discrete co-controllers each associated with a particular end user; each SDN co-controller including configuration data and routing data for an associated networked device;

dispatching the SDN co-controller by the master SDN controller to the networked devices associated with the respective end users for controlling thereof; and installing the SDN co-controller on the networked devices.

In one aspect there is provided a computer implemented method for controlling a software defined network (SDN); the method comprising:

providing a plurality of client portals which are configured for facilitating end users selecting resourses via local user interfaces;

providing a master control module in communication with the client portals and configured for managing flow control on the SDN network;

generating by the master control module a plurality of discrete control agents each associated with a particular end user and configured based on the resources selected by the particular end user; and dispatching the discrete control agents to the local devices of the respective end users for controlling thereof.

In another aspect, the end users are authenticated prior to the dispatching of the control agents.

In one aspect, the master control agent generates a configuration file for each resource which forms part of the services selected by the end user.

In another aspect, the configuration file is incorporated into the control agent.

In another aspect localised control is enabled for services specifically in relation to the services that the customer has selected In another aspect the end device is not dumbed down but instead programable control is enabled locally and specifically enabled for the individual customer In another aspect detailed low level analytics are gathered directly from the device and are transitted over to the orchestration solution to support customer management and control.

In one aspect discrete control agents are dispatched to an in-home network for the gathering of transport protocol related information to ensure accurate delivery of the services in accordance with the control criteria selected by the end user.

In another aspect, a unified control plane is dispatched across multiple access technologies e.g. DOCSIS, FTTx, xDSL, Wi-Fi etc. but not limited to the technologies which are provided by way of example only, thereby enabling operators to singularly deploy and control services in a unified fashion.

In a further aspect, granular control of the end device is provided so that unlike vCPE it is not dumbed down but instead programable control is enabled locally and specifically for the individual device in relation to customer service requirements.

In one aspect, an instance of each resource in created on the cloud.

In a further aspect, the requested resource is accessible via the client portal.

In another aspect, a network-function virtualisation (NFV) instance is configured.

The present disclosure also relates to a network controller for a software defined network (SDN), the network controller comprising:

a plurality of client portals configured for facilitating end users selecting network resources via local user interfaces;

a master control module in communication with the client portals and configured for managing flow control on the SDN network; the master control module being operable to generate a plurality of discrete control agents each associated with a particular end user and configured based on the network resources selected by the particular end user; and a communication module configured for dispatching or control of embedded discrete control agents to one or more local devices of the respective end user for controlling thereof.

Additionally, the present disclosure relates to a computer implemented method for controlling an SDN network; the method comprising:

providing a plurality of client portals which are configured for facilitating end users selecting network resourses of the SDN network via local user interfaces;

providing a master control module in communication with the client portals and configured for managing flow control on the SDN network;

generating a plurality of discrete control agents each associated with a particular end user and configured based on the network resources selected by the particular end user; and dispatching the discrete control agents to one or more local devices of the respective end user for locally controlling thereof.

Furthermore, the present disclosure relates to a computer-readable medium comprising non-transitory instructions which, when executed, cause a processor to carry a method for controlling an SDN network; the method comprising:

providing a plurality of client portals which are configured for facilitating end users selecting network resourses of the SDN network via local user interfaces;

providing a master control module in communication with the client portals and configured for managing flow control on the SDN network;

generating a plurality of discrete control agents each associated with a particular end user and configured based on the network resources selected by the particular end user; and dispatching the discrete control agents to one or more local devices of the respective end user for locally controlling thereof.

The present disclosure also relates to a computer implemented method for controlling a software defined network (SDN); the method comprising:

providing a plurality of client portals which are configured for facilitating end users selecting resourses via local user interfaces;

providing a master control module in communication with the client portals and configured for managing flow control on the SDN network;

generating by the master control module a plurality of discrete control agents each associated with a particular end user and configured based on the resources selected by the particular end user; and dispatching the discrete control agents to the local devices of the respective end users for controlling thereof.

Additionally, the disclosure relates to a computer implemented method for controlling access in a software defined network (SDN); the method comprising:

providing a master control module configured for managing flow control on the SDN network;

generating by the master control module a plurality of discrete access control agents each associated with particular nodes of the SDN network node for controlling access thereto; and dispatching the discrete access control agents to devices associated with the respective nodes for dynamically programming the devices with access control criteria.

The present disclosure also relates to a computer implemented method for controlling an in-home network in commmunciation with a software defined network (SDN); the method comprising:

providing a client portal for facilitating an end user interfacing with the in-home network for selecting local control criteria;

providing a master control module associated with the SDN network which in communication with the in-home network and configured for managing flow control;

generating by the master control module a plurality of discrete control agents each associated with a particular end user and configured based on the control criteria selected by the end user on the client portal; and dispatching the discrete control agents to the in-home network for controlling the devices of the in-home network in accordance with the control criteria selected by the end user.

In one aspect, discrete control agents are dispatched to the in-home network for the gathering of transport protocol related information to ensure accurate delivery of the services in accordance with the control criteria selected by the end user.

The present disclosure also relates to a computer implemented method for controlling a DOCSIS compatible network; the method comprising:

providing a master control module on a cable modem termination system (CMTS) which is configured for controlling DOCSIS cable modems;

generating by the master control module a plurality of discrete control agents each associated with a particular DOCSIS cable modem; and dispatching the discrete control agents to the DOCSIS cable modems for dynamically programming the DOCSIS cable modem with a boot-file from the CMTS without having to read a kernel daemon.

The foregoing and other features and advantages of preferred embodiments of the present disclosure are more readily apparent from the following detailed description. The detailed description proceeds with reference to the accompanying drawings.

BRIEF DESCRIPTION OF THE DRAWINGS

The present disclosure will now be described with reference to the accompanying drawings in which:

FIG. 17 is a block diagram illustrating details of the SDN architecture of FIG. 16.

DETAILED DESCRIPTION

Embodiments of the present disclosure will now be described with reference to some exemplary SDN platforms. It will be understood that the exemplary architecture is provided to assist in an understanding of the present teaching and is not to be construed as limiting in any fashion. Furthermore, modules or elements that are described with reference to any one Figure may be interchanged with those of other Figures or other equivalent elements without departing from the spirit of the present teaching.

Figure 1:
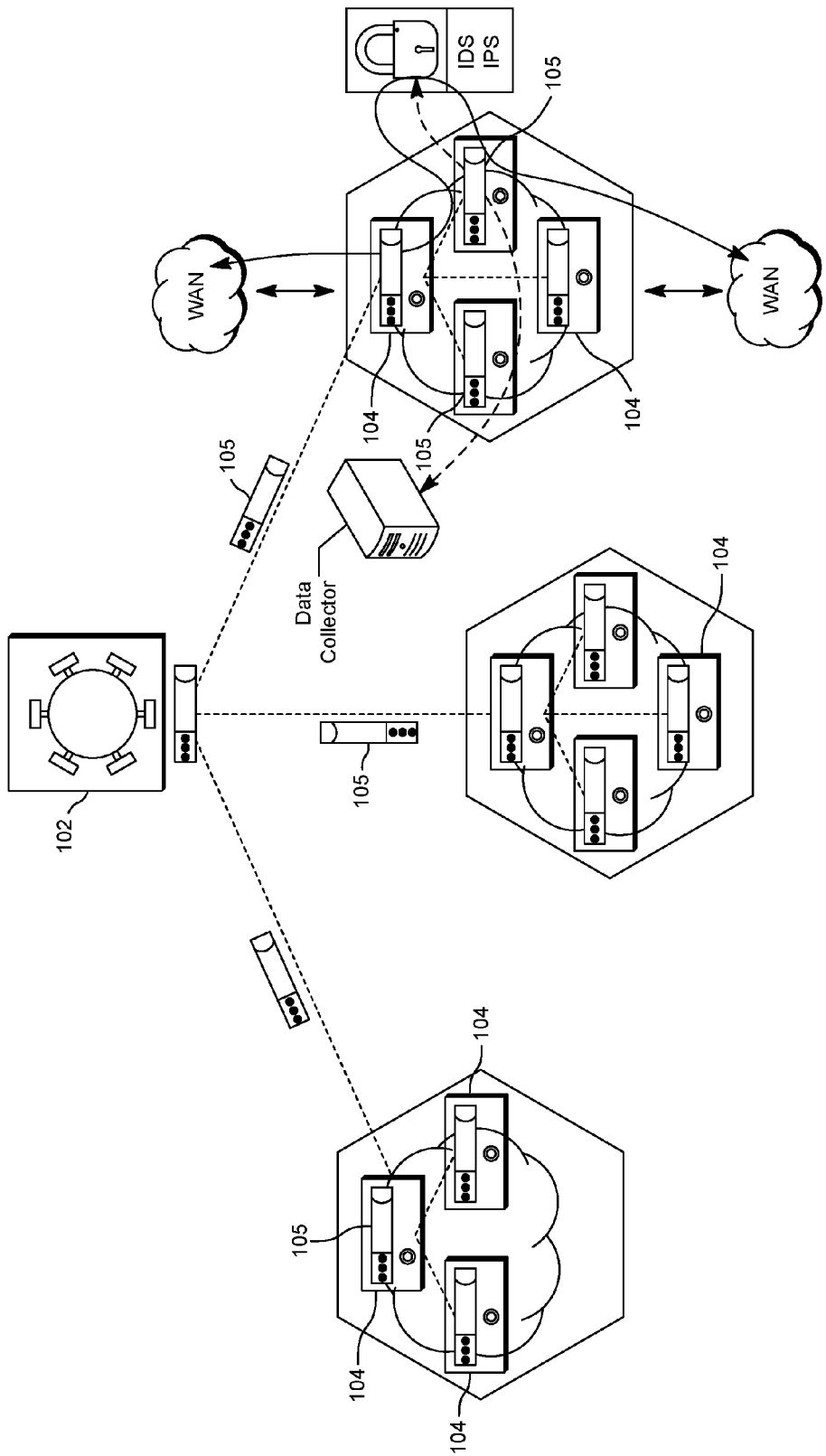
FIG. 1 is a block diagram illustrating an exemplary SDN platform in accordance with the present teaching.
Figure 2:
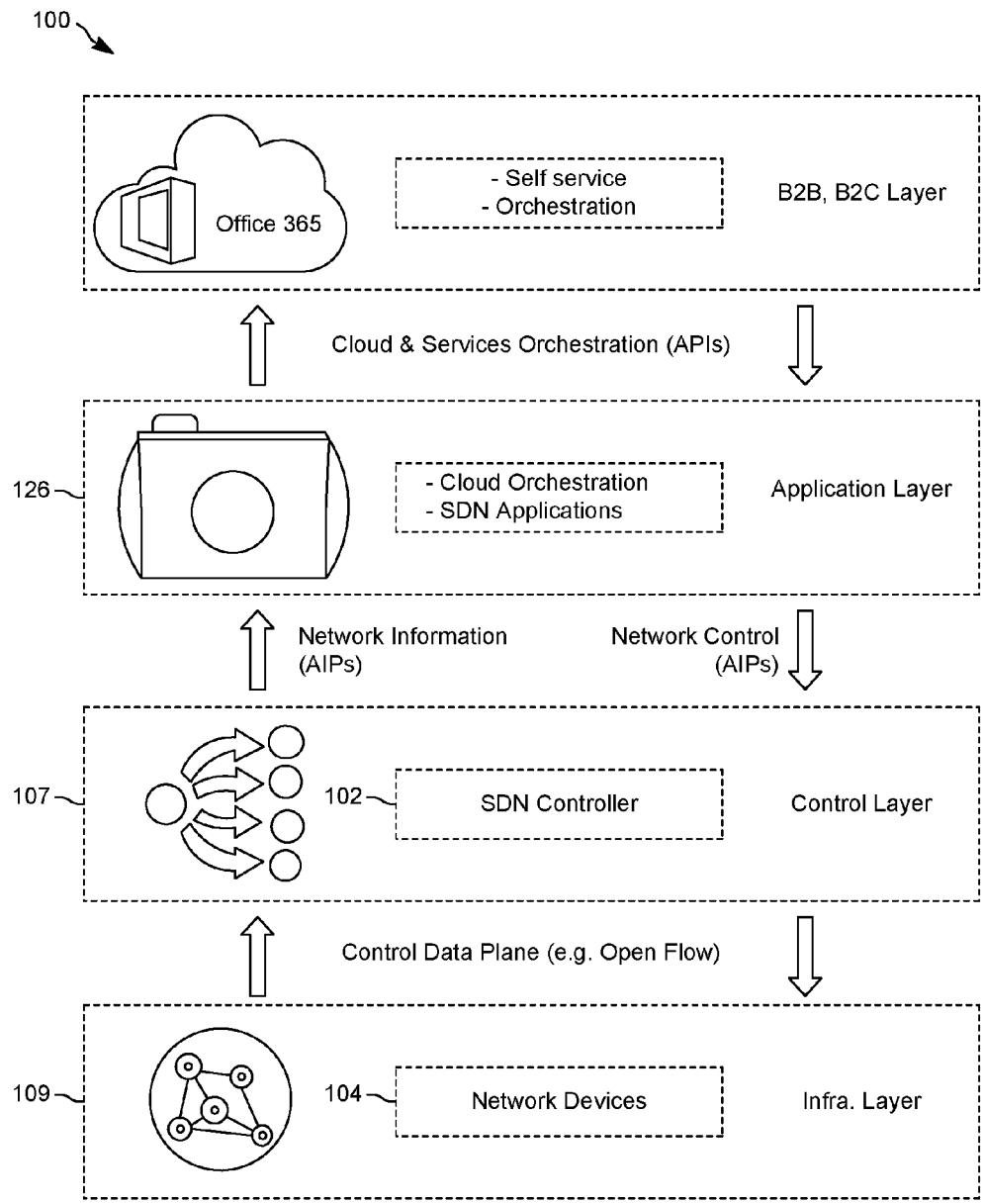
FIG. 2 is a block diagram illustrating details of the architecture of FIG. 1.
Figure 3:
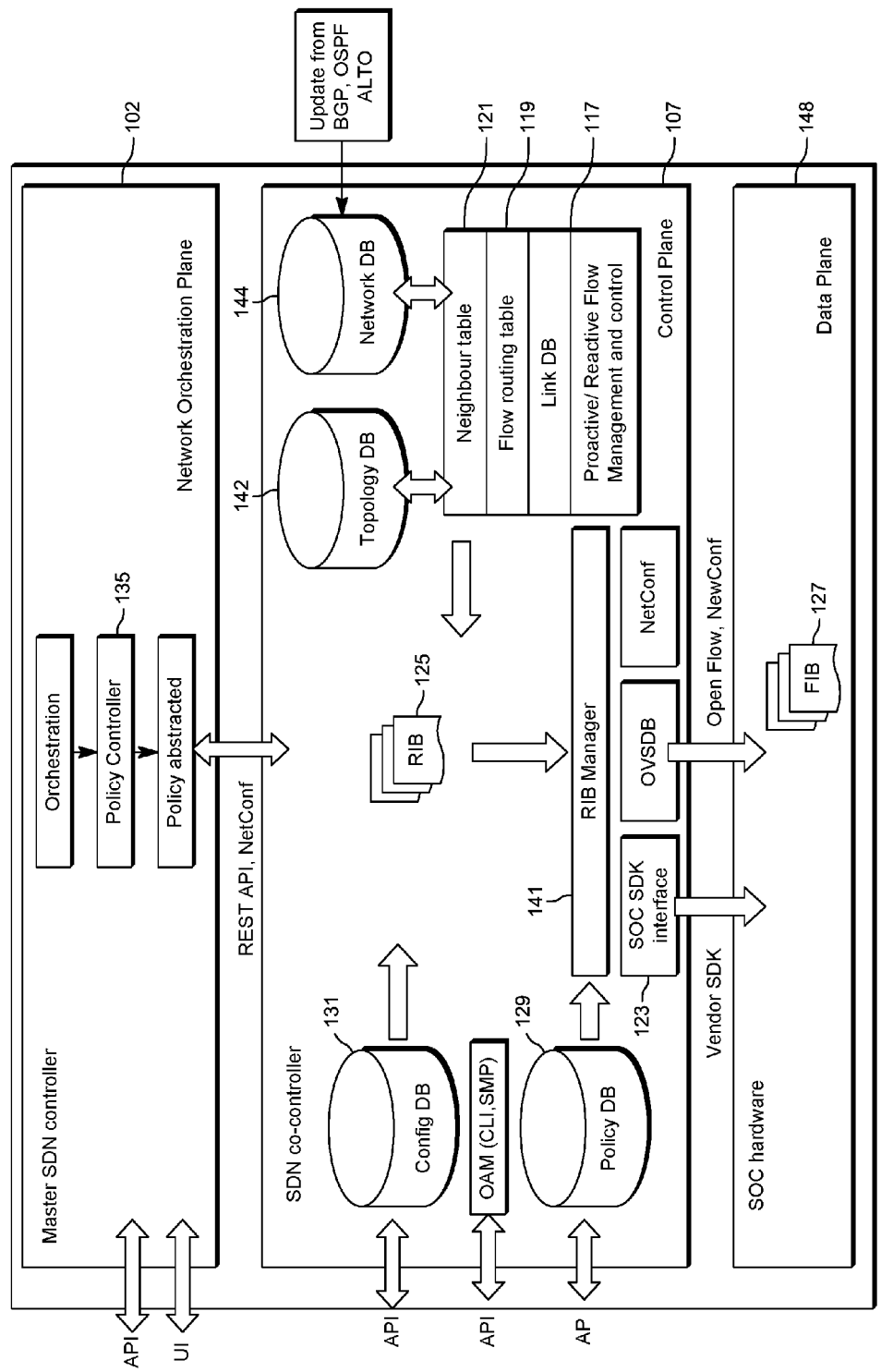
FIG. 3 is a block diagram illustrating details of the architecture of FIG. 1.

Referring to the drawings and initially to FIGS. 1 to 3, there is illustrated an SDN platform 100 in accordance with the present teaching. A master SDN controller 102 is configured to manage data flow control on the SDN network 103. The master SDN controller 102 is operable to generate routing flow data for a plurality of networked devices 104. The networked devices 104 may include but not limited to, network infrastructure equipment (NICs), amplifiers, servers, fibre nodes, cable modem termination systems (CMTS), Converged Cable Access Platforms (CCAP), Digital Subscriber Line Access Multiplexers (DSLAMs), optical line terminals (OLT), Optical Network Terminals (ONT), stand-alone WIFI access points, hand-held devices, or the like. The master SDN controller 102 has an end-to-end view of the entire SDN network 103, and information of all network paths and device capabilities. The master SDN controller 102 is operable to generate a plurality of SDN co-controller 105 each associated with a particular user. The master SDN controller 102 and the plurality of secondary SDN contollers 105 co-operate in order to calculate data paths based on both source and destination addresses; use different network paths for different traffic types and react to the condition of the network changes.

The SDN co-controller 105 are distributed by the master SDN controller 102 to the networked devices 104 associated with the respective users for controlling the devices 104 such that the devices 104 are operable to make local data routing decisions. Each SDN co-controller 105 includes configuration data and a routing engine. The distributed co-controllers 105 are installed on the networked devices 104 associated with particular end users. The discrete SDN co-controller 105 are configured to add network functions to the devices 105 which may include distributed routing, quality of service functions, access control lists functions and load balancing functions. These tasks would primarily have been done by the central SDN controller in SDN networks know heretofore.

Once installed on the devices 104 the distributed co-controllers 105 register with the master SDN controller 102 and are co-operable for controlling the routing of data from the networked devices over the SDN network 103. The distributed co-controllers 105 act as a distributed routing engine thereby removing hardware limitations such as Ternary Content Addressable Memory (TCAM) entries. Due to their lightweight implementation, the distributed co-controllers 105 may be installed on a range of devices, from low/highend switching platforms to Bare Metal, virtual machines and even network interface controllers (NIC s). Both the master SDN controller 102 and the SDN co-controller 105 may be adapted to the topology needs of both the LAN (EastWest) and WAN (North South) with unified routing using the border gateway protocol (BGP).

Topology management for service aware routing may be enabled through link discovery based on the link layer discovery protocol(LLDP)/bidirectional forwarding detection (BFD). The SDN co-controller 105 may be seamlessly integrated into a switch operating system such as LINUX or UNIX. The distributed co-controllers 105 are operable to run on the devices 104 as container instances and provide seamless integration with any legacy routing device or protocol.

The SDN platform 100 removes network complexity and ensures maximum QoS (Quality of Service) with real time programming of routes both within and between domains. The control plane of the SDN platform 100 is built on industry-standards with the benefit of removing the burden of vendor lock-in. The SDN platform 100 is provided with tools and feature-rich Application Programming Interfaces (API's) to empower users to tailor SDN applications and to define user specific policies, rules and optimisations for the SDN network 103. The SDN platform 100 integrates with public and private cloud configurations and reduces the provisioning time of application aware services to minutes instead of weeks, providing real operational cost savings. An intuitive web based interface dashboard enables users to quickly and seamlessly implement adds, moves and changes to the network 103 while combining programmatic network control with network state awareness to provide SLA (Service Level Agreement) assurance.

The SDN co-controller 105 comprises a repository of control and policy instructions for specific devices 104. The distributed SDN co-controller 105 are operable to make routing decisions locally on the devices 104 which alleviates delays that may occur if these routing decisions were made centrally rather than locally. Furthermore, the distributed SDN co-controller 105 facilitates individual granularity of setting specific policies for end users across a large number of devices 105, as to how their devices should be controlled and performance optimised. The SDN co-controller 105 also allows analytics to be gathered from the devices 104 in order to determine if the devices 105 are operating in an optimum fashion. If it is determined that the devices 105 are not operating efficiently, the platform 100 is able to dynamically modify the operational configuartion of the devices 104 to improve efficient or the quality of service experienced by the user.

The SDN platform 100 provides full visibility of an entire network topology through a control plane 107, which unlike traditional SDN deployments, is both centralised using the master SDN controller 102, as well as being fully distributed, using distributed SDN co-controllers 105. The distributed co-controllers 105 are intelligent light weight routing engine which may be dispatched to any Openflow enabled CPE such as a switch, server, NIC, or the like. The control plane 107 may be built on industry-standards with the benefit of removing the burden of vendor lock-in. The architecture 100 provides the tools to tailor SDN applications and to define the user's own policies, rules, and optimisations for the network 110.

The master SDN controller 102 and the SDN co-controller 105 may be based on protocols, such as OpenFlow or NetConf/YANG, that allow a server to tell switches where to send packets. In an OpenFlow compatible switch the data path is separate from the control path. The data path is resident on the switch itself while the master SDN controller 102 provides the control path which makes the routing decisions. The OpenFlow protocol provides a means for the switch and master SDN controller 102 to communicate and provides information on the flows that are being programmed into the network. In addition the NetConf protocol with its use of YANG models may also be used to program specific network functions within the networked devices 105.

The control plane 107 is highly resilient, facilitated through a federation of distributed co-controllers 105, forming a virtualised single point of SDN control. Each federated individual controller in turn automatically dispatches a lightweight SDN controlling agent to each of the network devices 104 in infrastructure layer 109, providing complete visibility of the network. The platform 100 includes an application layer 126 which integrates the orchestration of the Openstack cloud, to manage the delivery and configuration of cloud based virtual network services, applications and functions. Also residing in the application layer 126 are series of tools and systems, interface portals which enable a service provider and their customers to operate, optimize and self-serve. The overall platform 100 integrates to the three layers of the SDN model providing a comprehensive suite of capabilities as graphically illustrated in FIG. 2.

Figure 4:
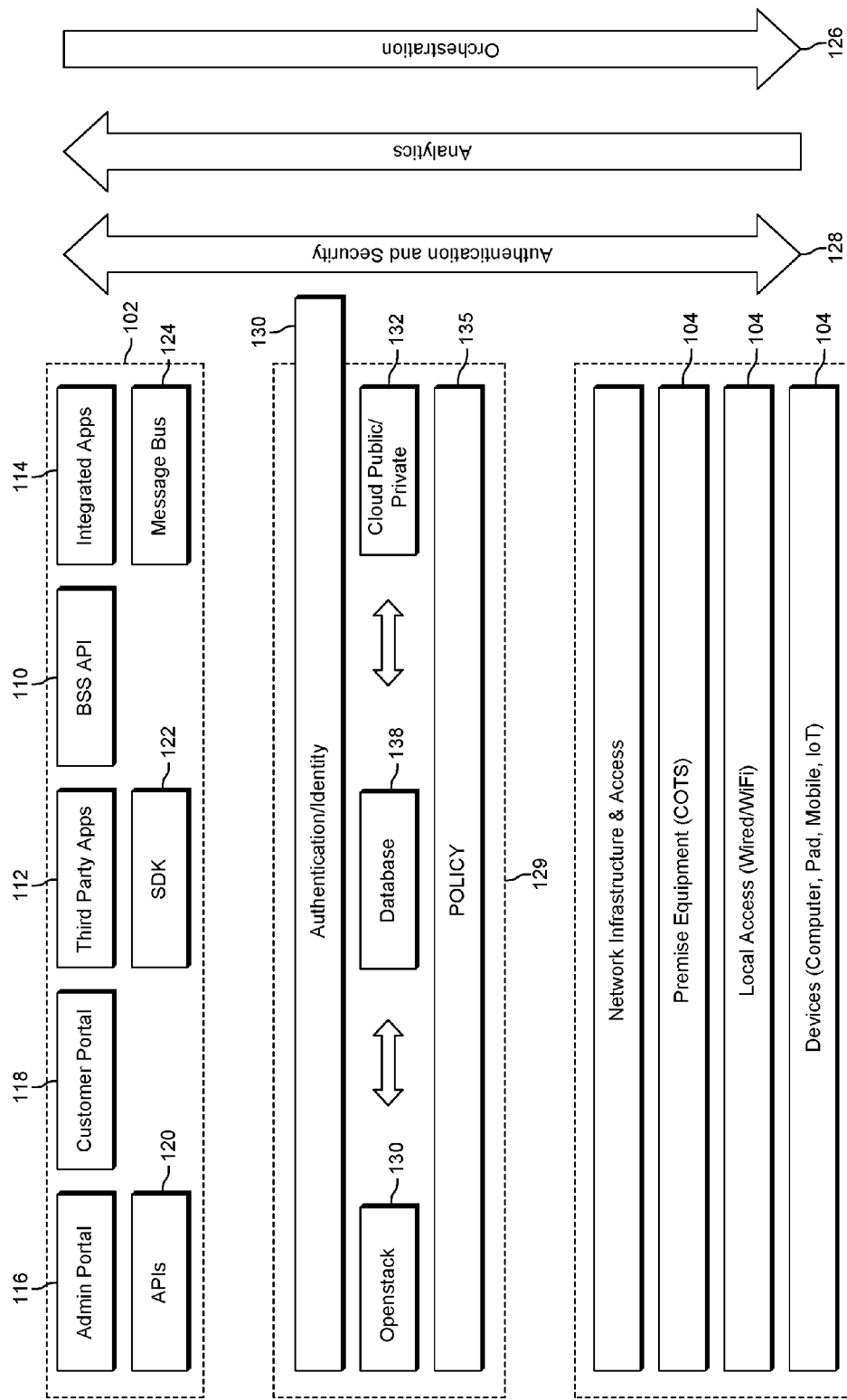
FIG. 4 is a block diagram illustrating details of the architecture of FIG. 1.

An exemplary architecture in accordance with the present teaching is illustrated in FIGS. 3 and 4. Portal interfaces to the orchestration architecture bring controls from business support systems (BSS) stacks 110, $3^{rd}$ party applications 112, control applications 114 which form part of the functions of an administrator portal 116 and a customer portal 118. These applications communicate via supported application programming interfaces (APIs) 120, software development kit (SDK) 122, message bus 124 and all communications are first identified and authenticated for access to an orchestration layer 126 at an authentication/ identity layer 128. The lightweight directory access protocol (LDAP) may run on the authentication/identity layer 128. It provides a mechanism used to connect to, search, and modify Internet directories. The LDAP directory service is based on a client-server model. Upon validation a token is generated and this token is communicated through the layers to identify authorization for configuration of functional components of the architecture.

OpenStack 130 is fully integrated into the solution and its orchestration APIs are used to gather and signal the commutation of the authentication and identity tokens to all components in the system. In turn OpenStack 130 is used to host the administration system components within its hardware managed and orchestrated environment. Its cloud capabilities 132 are used for the hosting of customer services and for connection to public clouds through API controls.

A policy control engine 135 identifies and maps the appropriate configuration data to the device 104 which is being controlled. This is achieved through the querying of the live customer records within a database 138 which has gathered analytics using the distributed co-controllers 105. These analytics are gathered from the live customer, profiles etc. data structures in the Open-Data Database which has been populated with analytics from the SDN controlled devices 104 and from data obtained through the provisioning process based upon customer profiles and product profiles.

All data is mapped into the database 138 in appropriately structured records for fast read and write. The policy controller 135 identifies and maps the customer's profile to the appropriate configurations required for the system-on-chip (SOC) of the device 104 based upon the customer's product profile and the role from the authentication and identity management token assigned by authentication/ identity layer 128.

The master SDN controller 102 may reside in the control plane 107. The master SDN controller 102 comprises a primary control/orchestration component in communication with the customer portal 118 via the higher level orchestration and data layers and is configured for managing flow control on the SDN network 103. The control/orchestration component are operable to generate a plurality of discrete co-controllers 105 each associated with a particular end user and configured based on the network resources selected by the particular end user via the customer portal 118. The master SDN controller 102 is configured for dispatching the discrete SDN co-controller 105 to one or more local devices 104 of the respective end user for controlling thereof. The discrete SDN co-controller 105 are despatched via the orchestration solution when the need for a new layer of control is identified through analysis produced by the orchestration. The distributed co-controllers 105 are extremely light weight agents and may be populated into the firmware or BIOS of the devices 104. In one example the co-controllers 105 are binary de-ployable.

The primary control is handled by the orchestration plane 126 and handles administrative tasks like authentication, logging, discovery and configuration. The multi-layer co-controllers 105 are provided in the multi-component functions of the multi-functional control planes 107. These distributed co-controllers 105 administer the internal device operations and provide the instructions used by the routing engines to direct the packets via programming using NetConf/YANG, OpenFlow/OVSDB or direct programming via the system on chip (SOC) software development kit (SDK). It may also run the routing and switching protocols and feeds operational data back to the orchestration plane and reports back analytics via the master SDN controller 102 to the orchestration layer 126 and the control layer 107.

In addition the distributed co-controllers 105 build a topology database 142 and uses this to identify its neighbours and relevant paths. The topology database 142 is used to make forwarding decisions and to define proactive and reactive forwarding decisions. The co-controllers 105 build a network database 144 and use this to build a full network visibility of all known paths. This network database 144 is used to integrate into its neighbours and to relevant paths, the interfaces may include the exterior gateway protocol (EGP) and the interior gateway protocol (IGP). The network database 144 is used to construct forwarding decisions and to define proactive and reactive forwarding controls. In addition the SDN co-controller 105 may support Border Gateway Protocol (BGP), Open Shortest Path First (OSPF), Application-Layer Traffic Optimization (ALTO) and other EGPs and IGP to populate full network awareness for all forwarding decisions. Data gathered from these components is evaluated using the data created from a link database 117, network table 121, flow forwarding table 119 for the creation of reactive and proactive forwarding control. Forwarding control for the devices 104 are generated and added to the routing information base (RIB) 125 for the programming of devices 104 with a forwarding information base (FIB) 127 via available interfaces 123 such as SOC SDK, Open vSwitch Database (OVSDB) or Network Configuration Protocol (NetCOnf)/Yet Another Next Generation (YANG). An RIB manager 141 is operable to create a forwarding information base (FIB) on the devices 104 which is used by the operating system of the device 104 to find the proper interface to which the input interface should forward a data packet. Policy data is stored is a policy database 129 and configuration data is stored in a configuration database 131. These are generated from instructions received from the policy controller 135 from the higher level orchestration via the representational state transfer (REST) API. The data plane 148 is the engine room that moves packets through the device 104, using the flow routing table 119 supplied by the distributed co-controllers 105 to determine the output port. This is programmed and instructions sent using NetConf/ YANG, OpenFlow/OVSDB or direct programming via the SOC SDK.

The master SDN controller 102 and the SDN co-controllers 105 cooperate to operate as an out-of-band controller that fetches and dynamically programmes the configuration of the devices 104 that the customer has selected using the customer portal 118. Flows are controlled from the devices 104 and a bespoke topological forwarding map is created for the customer environment to enable accurate forwarding decisions. The devices 104 are enabled with this lightweight out of band SDN controller that is integrated with a remote orchestration solution to receive instructions sets and to automatically deliver service flow control, analytics gathering and to trigger customer requested changes to the customer services in real time.

The distributed co-controllers 105 may be distributed as a lightweight controller on a range of low power, low CPU CPE's, network infrastructure equipment, NICs, amplifiers, Servers, fibre nodes, CMTS, CCAP, Amplifiers, DSLAMs, OLT, ONT, standalone WIFI access points, hand-held devices, etc and provision services at a highly reduced latency to enable high quality, value add Service-Level Agreement (SLA) delivery while significantly improving an organization's ability to quickly adapt to changing customer/ network demands. The platform 100 provides complete end-to-end visualization of all NFV and SDN services that is both hierarchical and multi-layer. This visualization also includes integrated alarming, availability, performance, service quality, and SLA conformance information making it a single view for comprehensive assessment of service health. This brings a dynamic and accurate view and reachability of network and associated services, a consolidated view of the health of each service and resource management and the ability to quickly troubleshoot and identify impacted services.

In an exemplary embodiment, the SDN platform 100 may be used to eliminate boot file management of DOCSIS cable modems and automating service orchestration. The SDN platform 100 may be configured for provisioning and orchestration of the IP stack and distributed networking of in-home services in DOCSIS modems. The platform 100 works as an out-of-band controller that fetches and dynamically programmes the boot-file from CMTS to cable modem without having the need to read as a kernel daemon thereby reducing the processing requirements of the cable modem (CM) as well as elimination of operators need to maintain multiple boot files. Currently millions of cable modems are being provisioned globally but one of the significant weaknesses that may be perceived in the [DOCSIS] provisioning model is the lack of a dynamic method of updating a service. Few of the key issues troubling multiple-system operators (MSG's) and subscribers can be described as:

Sharing personal content across router boundaries
Optimizing in-home network paths
MSO visibility and management of the home network
Consistently administering and enforcing policy—Firewall—Parental controls
Remote access
New services Many service providers operate their network with little or weak primary control over its configuration and management. This means that the network configuration and state is effectively stored in a giant distributed database. This is not inherently a bad state of affairs, but network operators aren't always good at getting the information in that giant database into a form that is usable for making business decisions that optimize the use of the network and the services that run over it. The boot file handles the DNA of any given DOCSIS cable modem and this can be made dynamic and programmable using the SDN platform 100 in accordance with the present teaching which overcomes the issues listed above. The operator is able to reduce the service provisioning process to a single transaction rather than a complex series of steps involving multiple systems and humans.

The SDN platform 100 may be used to abstract the service definition and topologies from the physical access and the devices used to provide the service. This abstraction allows for maximum flexibility in building a provisioning system that is agnostic to the access technologies being used. For example when complex services like L3 VPN (virtual private routed network) need to be offered to customers or a certain predefined Provider Edge (PE)-Customer Edge (CE) routing protocol configuration needs to be done to ensure correct routes are announced/filtered complex and chained services, such as providing inline firewall services, or providing access to cloud services from within a VPN are required to be done. Higher layer services like these are examples of services where the service definition may extend beyond attachment circuits and elements in the network participate in the routing protocol and require more state exchange between the end point and the network, so in these today's DOCSIS provisioning model may be inadequate and hence our combination of SDN to manage such orchestration via OpenFlow is extremely useful for rapid provisioning and service updates.

The customer portal 118 is the hub of information and self-service for the customer. It provides fast access to a broad range of reports and tools, which enable the customer to select and understand their services and more critically, how these are being used. Through an intuitive menu, the customer portal 118 enables the customer to access a wide portfolio of applications, services and upgrades, which can in real-time, be purchased, delivered and usable within minutes. For reporting, the customer is able to personalize individual portal access and information shown, detailing for example; usage, time of day, browsing activity and much more. The customer, now armed with this data has an informed choice as to what they then allow, prohibit and restrict. The customer portal 118 displays one or more performance enhancing options based on analytics gathered by the SDN co-controllers 105. The configuration data associated with the SDN co-controllers 105 is updated in response to the end user selecting one or more performance enhancing options. Thus, the performance of the devices 104 and the overall network 103 may be optimised based on input received from the end user through their customer portal 118. The mapping function enables the customer to have visibility of all the connected devices in their home, through a simple topology with click down statics on each user. The portal 118 also provides real time notifications and recommendations which may be of interest, based upon the customer profile and service usage. Extending the reach of the portal, these notifications can also be simply linked to mobile devices for off-line access to alerts.

The installed SDN co-controller 105 may use the updated configuration data to modify operational configuration of the networked devices 104. For example, the operational configuration of the networked devices may be modified to increase a quality of service parameter. The operational settings of the networked devices may be updated in real-time while the devices 105 are online. Alternatively, the operational configuration of the networked devices 105 may be updated while the devices 105 are in a sleep-mode. In an exemplary arrangement, the operational configuration of the networked devices 105 are updated by changing to an alternative communication channel to avoid cross-talk from neighbouring devices. The communication channel may be a WIFI channel, for example. In another example, the operational configuration of the networked device may be changed to reduce power consumption of the devices 105. In this way, the operational configuration of the networked device 105 maybe changed by reprogramming a power interface. In another example, the operational configuration of the networked device 105 maybe changed to increase priority to available bandwidth or decrease priority to available bandwidth. It is envisaged that the SDN co-controllers 105 may be configured to assign a first priority setting to a first set of network devices 104 and assigning a second priority setting a second set of network devices 104. The first priority setting may be associated with a first bandwidth limit, and the second priority setting may be associated with a second bandwidth limit.

Customer portal 118 is able to render real-time data on the network usage, performance and services selection, utilizing the comprehensive flow of information and control between the Orchestrator, Cloud and Agent. With a suite of tools, APIs, data and languages the customer portal 118 is able integrate and interact with the intelligence of an OpenFlow SDN Orchestrator to enable on-demand, real time self service provisioning from cloud to device 104. The ever-increasing demand from customers for service quality, high availability, choice and customer care is placing the Network Operations Centre (NOC), with its associated tools, process and resources under overwhelming pressure. With services migrating from supply to demand, there has never been such a focus on operational excellence. The days of operations being completely removed from the customer experience are gone. Migrating such tools into the Call Centre to be at the forefront of Customer Technology is evolving at pace, SDN challenges the norms of network integrated data/control plane, with Cloud and NFV abstracting the physical topologies. Meantime, Operations is expected as a minimum to keep up but stay ahead of the curve.

The administration portal 116 has been designed to provide a suite of tools and reports which allow insight and intervention from the physical through to the application layer. Couple this with the ability to apply applications to detect and react dynamically to network events thus tackling issues real-time, far faster than has been possible with legacy tools and process. Operations through various levels of access from Supervisor to user a selection of windows, which provide the full FCAPS (the recognized standard model and framework) suite of network management tools and reporting. It also allows the application of simple automated rules to proactively re-configure the network 103 and virtual services, minimizing outages and service failures predicated on certain conditions being collated back from the network/devices.

Figure 5:
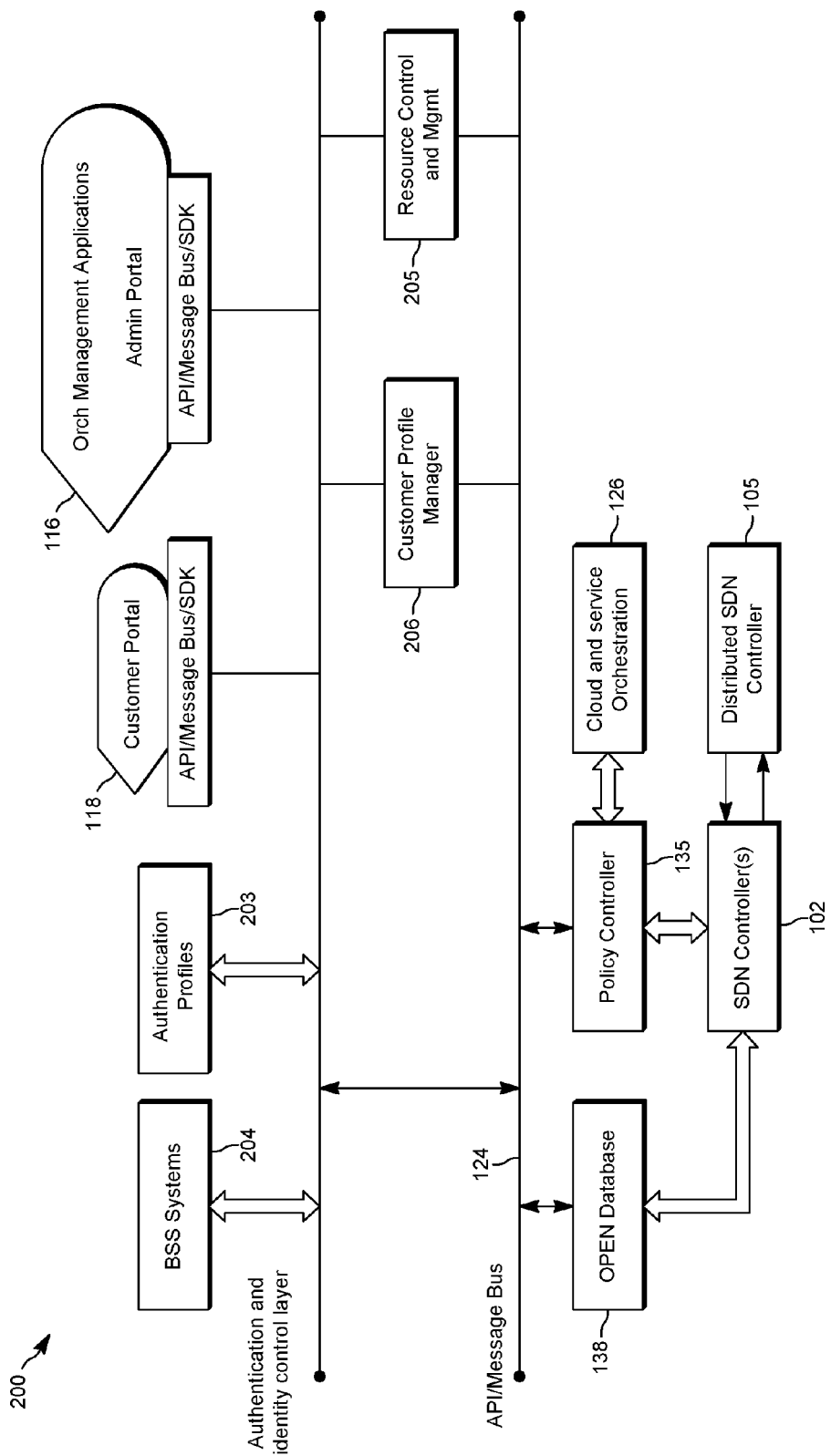
FIG. 5 is a block diagram illustrating another exemplary SDN platform in accordance with the present teaching.
Figure 6:
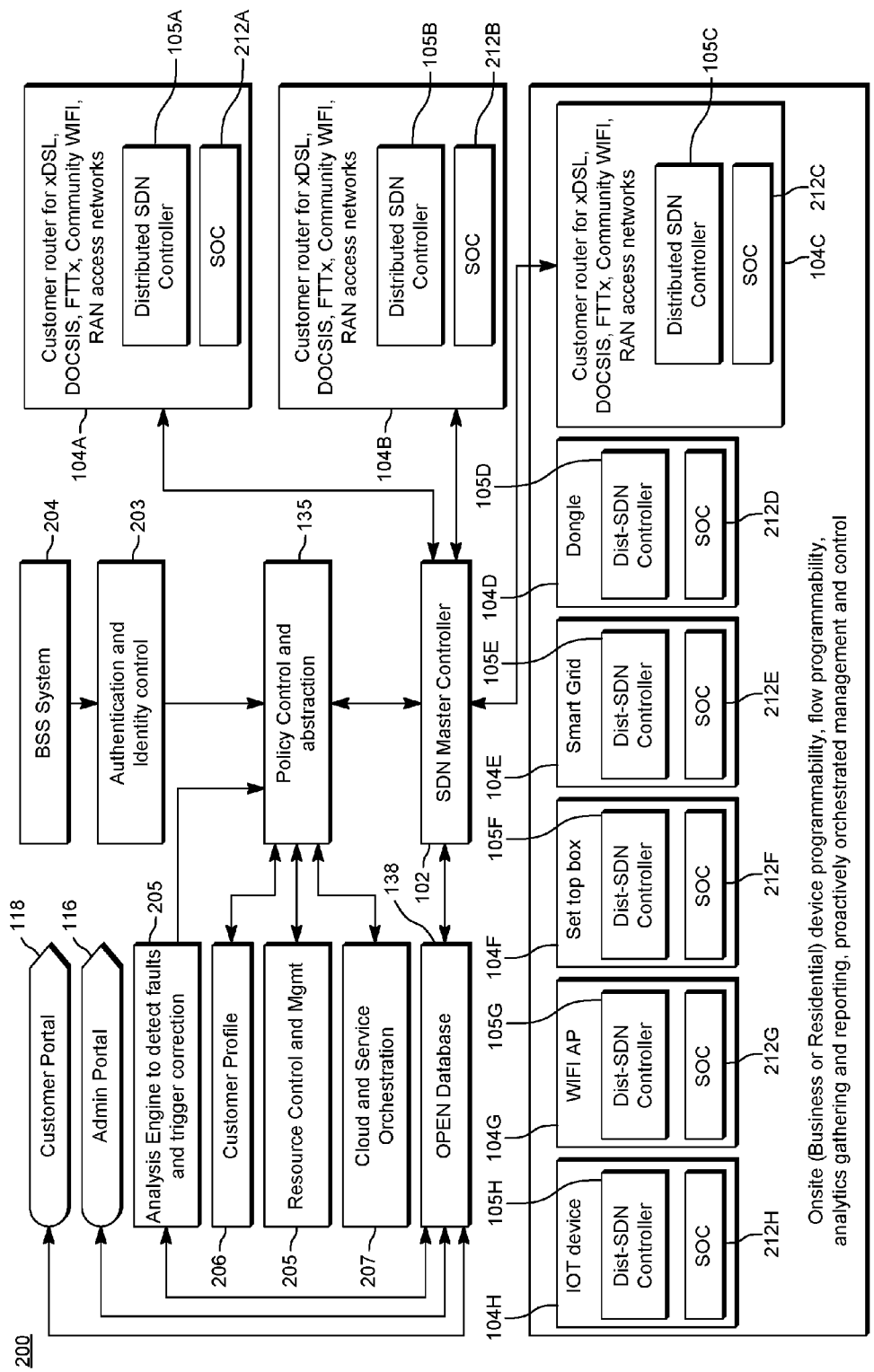
FIG. 6 is a block diagram illustrating details of the architecture of FIG. 5.
Figure 7:
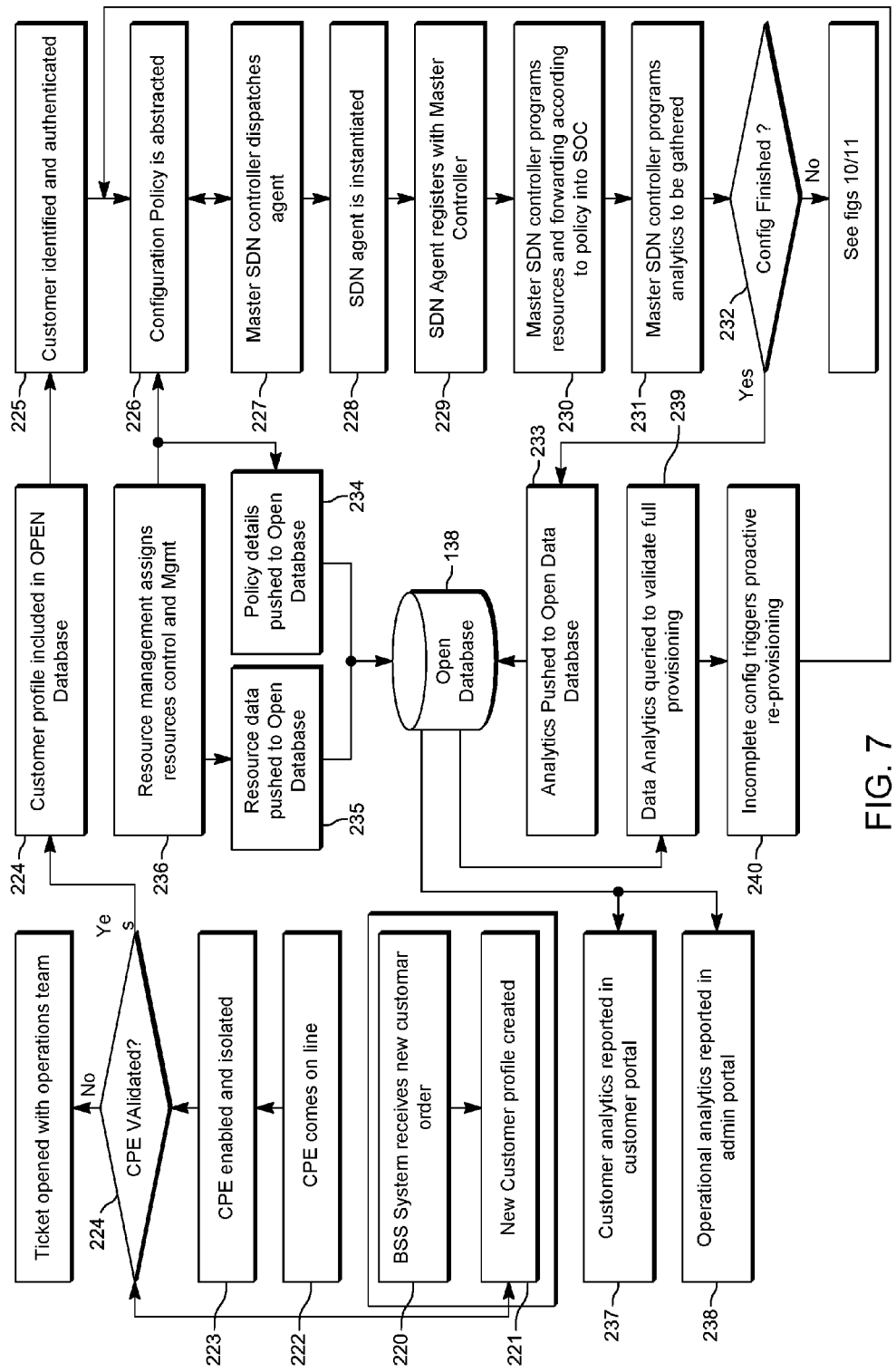
FIG. 7 is a flow chart illustrating exemplary steps during the operation of the SDN platform of FIG. 1 or FIG. 5.

Referring to now FIGS. 5-7 which illustrates an exemplary SDN platform 200 which is also in accordance with the present teaching. The SDN platform 200 is substantially similar to the SDN platform 100 and like elements are indicate by similar reference numerals. BSS system 204 receives a new customer order, step 220. A new customer profile is created by customer profile manager 206, step 221. A customer-premise equipment (CPE) device 104 comes on line, step 222. The CPE 104 is enabled and isolated, step 223. The CPE 104 is validated by authentication module 203, step 224. The new customer profile is stored in an open database 138, step 224. The customer is identified and authenticated by authentication module 203, step 225. Policy controller 135 communicates with a customer profile manager 206, resource controller 205 and orchestration module 207and abstracts a configuration policy for the new customer, step 226. A master SDN controller 102 generates appropriate distributed co-controllers 105A-105H and dispatches the distributed co-controllers 105A-105H to the CPE devices 104 associated with the new customer, step 227. The SDN co-controller 105 are instantiated on the CPEs 105A-105H, step 228. The distributed co-controllers once installed on the CPEs 104A-104H register with the master SDN controller 102, step 229. The master SDN controller 102 programs appropriate resources and routing tables into the system on chips 212A-212H of each CPE 211A-211H using the distributed co-controllers 105A-105, step 230. After the co-controllers are installed they operate as local routing engines on the CPEs 104. The configuration of the CPEs 104A-104H is finished, step 232.The distributed SDN co-controller 105A-105H push analytics about their respective CPEs 104A-104H back to the open database 138 via the master SDN controller 102. Customer analytics from each CPE 104A-104H is accessible to customer from the open database 138 via their customer portal 118, step 237. Operational analytics from each CPE 104A-104H is accessible to the admin portal 116 from the open database 138, step 238. The resource controller 236 is operable to push resource data to the open database, step 235. Furthermore, the resource controller 236 is operable to push policy data to the open database 211, step 234. An analysis engine 205 is operable to analyse the data in the database 138, and modify the policy and control data for the respective CPEs 104. The modified policy and control data is pushed to the distributed co-controllers 105 by the master SDN controller 102 in order to reconfigure operational settings on the CPEs 104 to enhance the performance of the devices 104. Enhancing performance of the CPEs 104 may include, by way of example, improving the quality of service experienced by the end user. In this way, it will be appreciated by those skilled in the art that the health of the CPEs 104 are continuously being monitored by the co-controllers 105, and if a problem is detected the co-controllers 105 are able to rectify the problem by reconfiguring the CPEs 104 in real-time.

Figure 8:
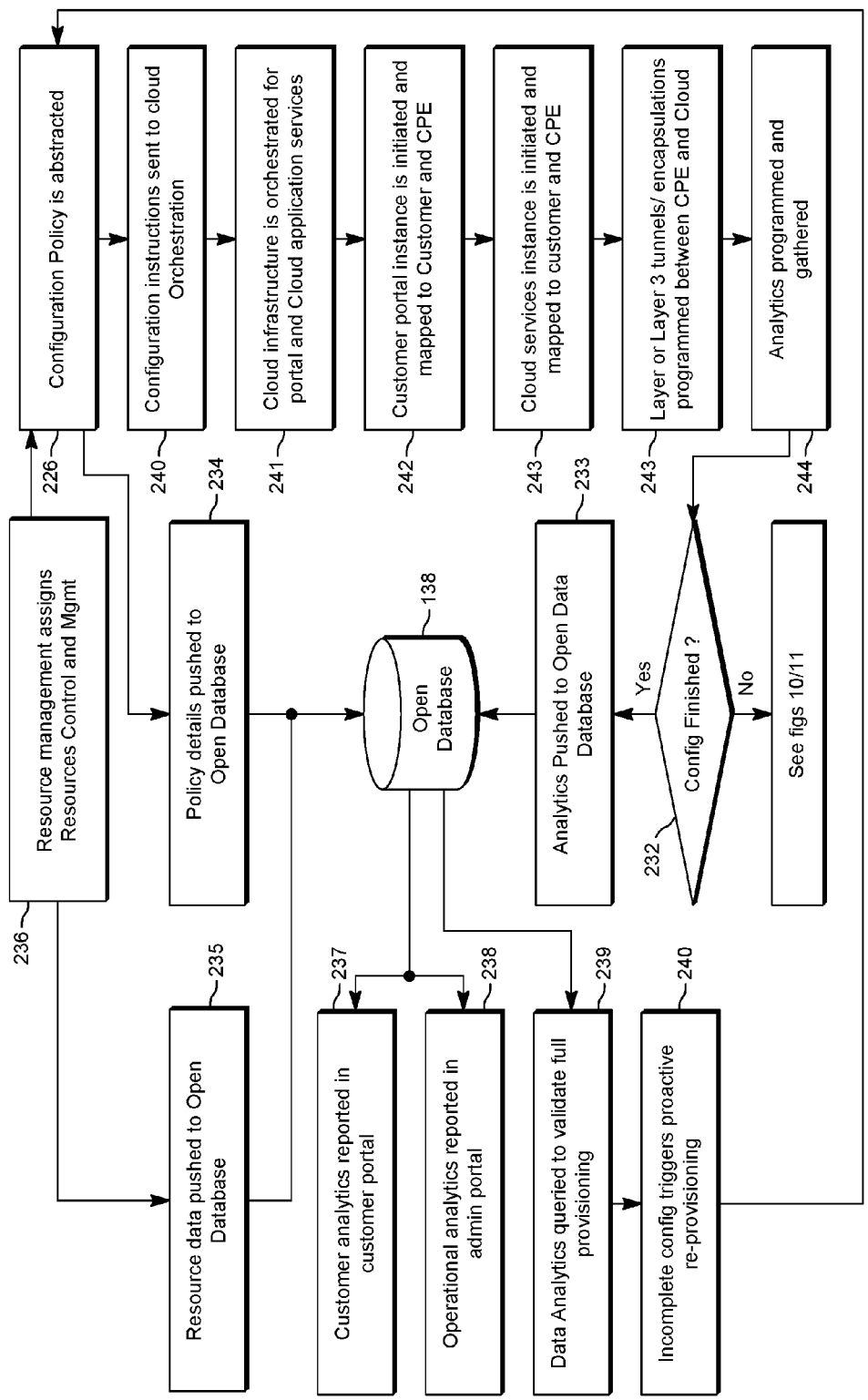
FIG. 8 is a flow chart illustrating exemplary steps during the operation of the SDN platform of FIG. 1 or FIG. 5.

Referring to now FIG. 8 which illustrates a flowchart showing exemplary steps of the SDN platform in operation which is also in accordance with the present teaching. The flow chart of FIG. 8 is substantially to the flow chart of FIG. 7 and like elements are identified by similar reference numerals. The main difference is that steps 240-244 of FIG. 8 replaces steps 227-231 of FIG. 7 while the remaining steps are substantially similar. After the configuration policy is abstracted in step 226, configuration instructions are sent to a cloud orchestration, step 240. Cloud infastructure is orchestrated for portal and cloud application services, step 241. A customer portal instance is initiated and mapped to the customer and the CPE 104, step 243. Communication tunnels are opened between the CPE 104 and the cloud service instance, step 243. Analytics is programmed and gathered from the CPEs, step 244. The operation of the remaining steps is as previously described with reference to FIG. 7.

Figure 9:
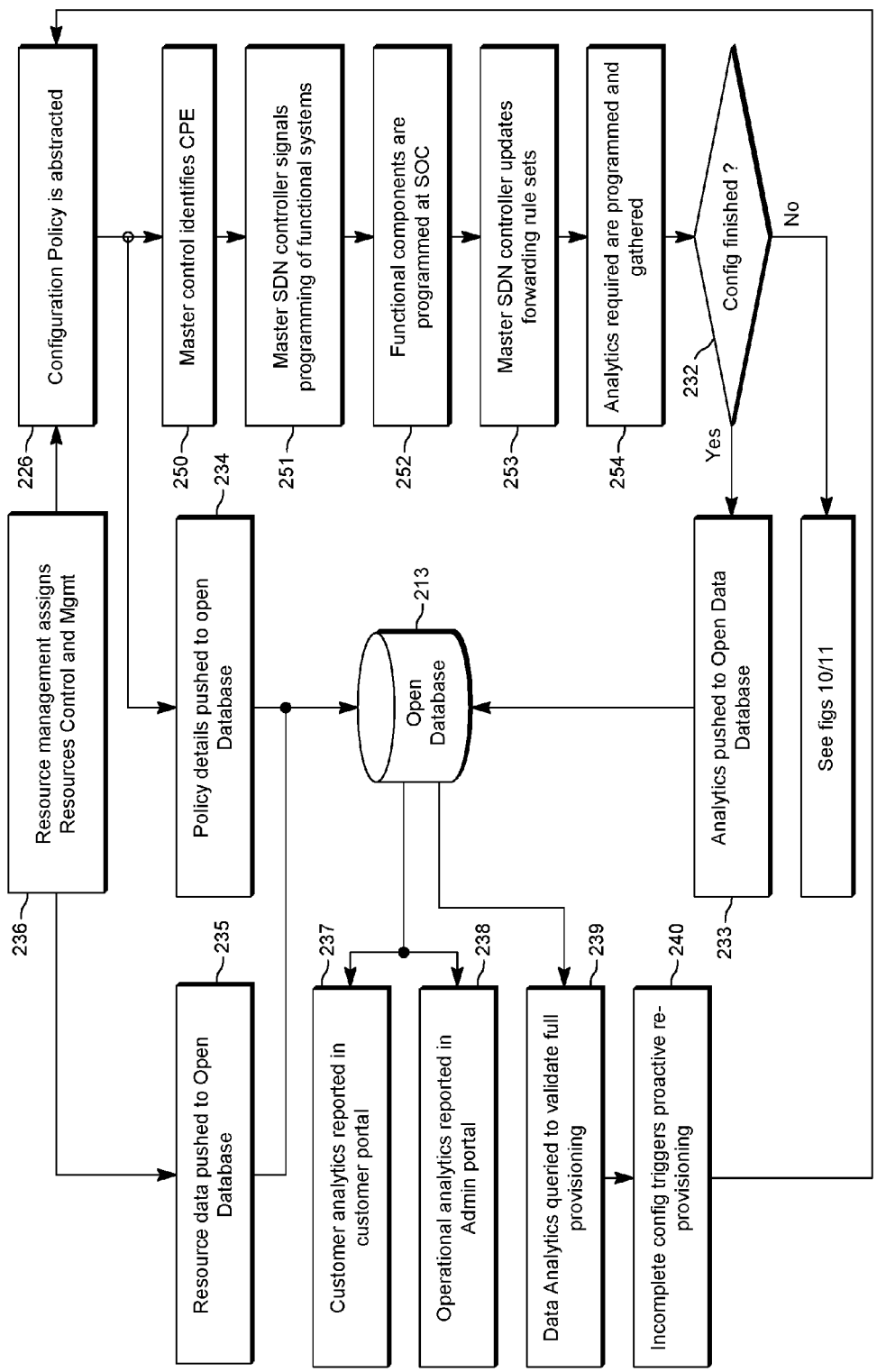
FIG. 9 is a flow chart illustrating exemplary steps during the operation of the SDN platform of FIG. 1 or FIG. 5.

Referring to FIG. 9 which illustrates anonther flowchart showing exemplary steps of the SDN platform in operation which is also in accordance with the present teaching. The flow chart of FIG. 9 is substantially to the flow chart of FIG. 7 and like elements are identified by similar reference numerals. The main difference is that steps 250-254 of FIG. 9 replaces steps 227-231 of FIG. 7 while the remaining steps are substantially similar. After the configuration policy is abstracted in step 226, the primary control identifies the CPE 211A-211H, step 250. The master SDN controller 102 initiates programming of system functions, step 251. Functional components are programmed at SOC, step 252. The co-controllers 105 update forwarding rules sets for the respective CPE 211A-211H. The required anaytics are programmed into the CPE211A-211H and gathered. The operation of the remaining steps is as previously described with reference to FIG. 7.

Figure 10:
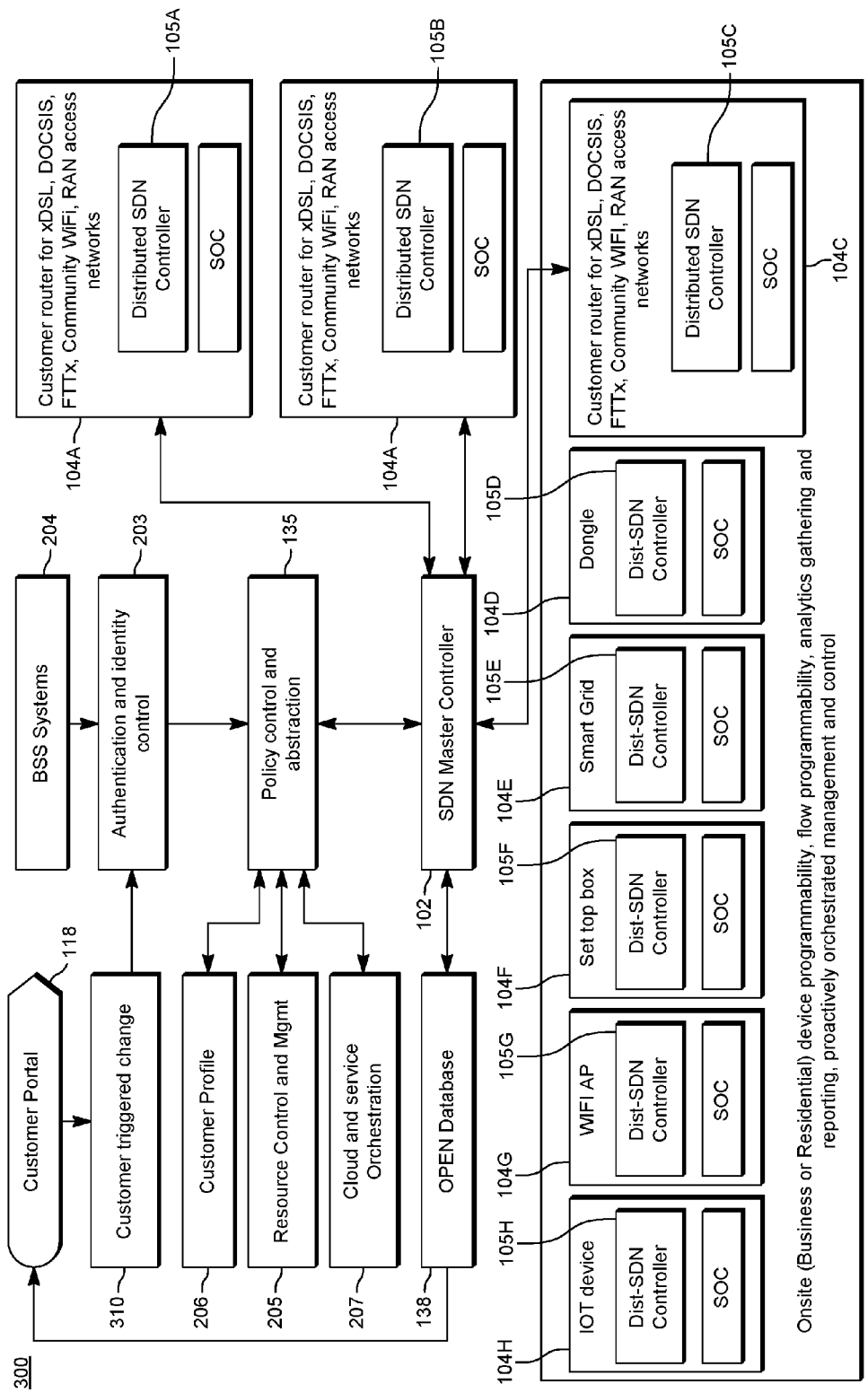
FIG. 10 is a block diagram illustrating another exemplary SDN platform in accordance with the present teaching.

Referring to FIG. 10 there is illustrated another SDN platform 300 which is also in accordance with the present teaching. The SDN platform 300 is substantially similar to the SDN platform 100 and like components are indicated by similar reference numerals. The main difference is that only one portal is provided, namely customer portal 118, which allows a cusotmer to trigger a change to the policy and/or control data, step 310. The change of policy and/or control data are implemented on the CPE 104A-104H by the co-controllers 105 in a manner as previously described. Otherwise the operation of the SDN platform 300 operates in a similar fashion to the SDN 100.

Figure 11:
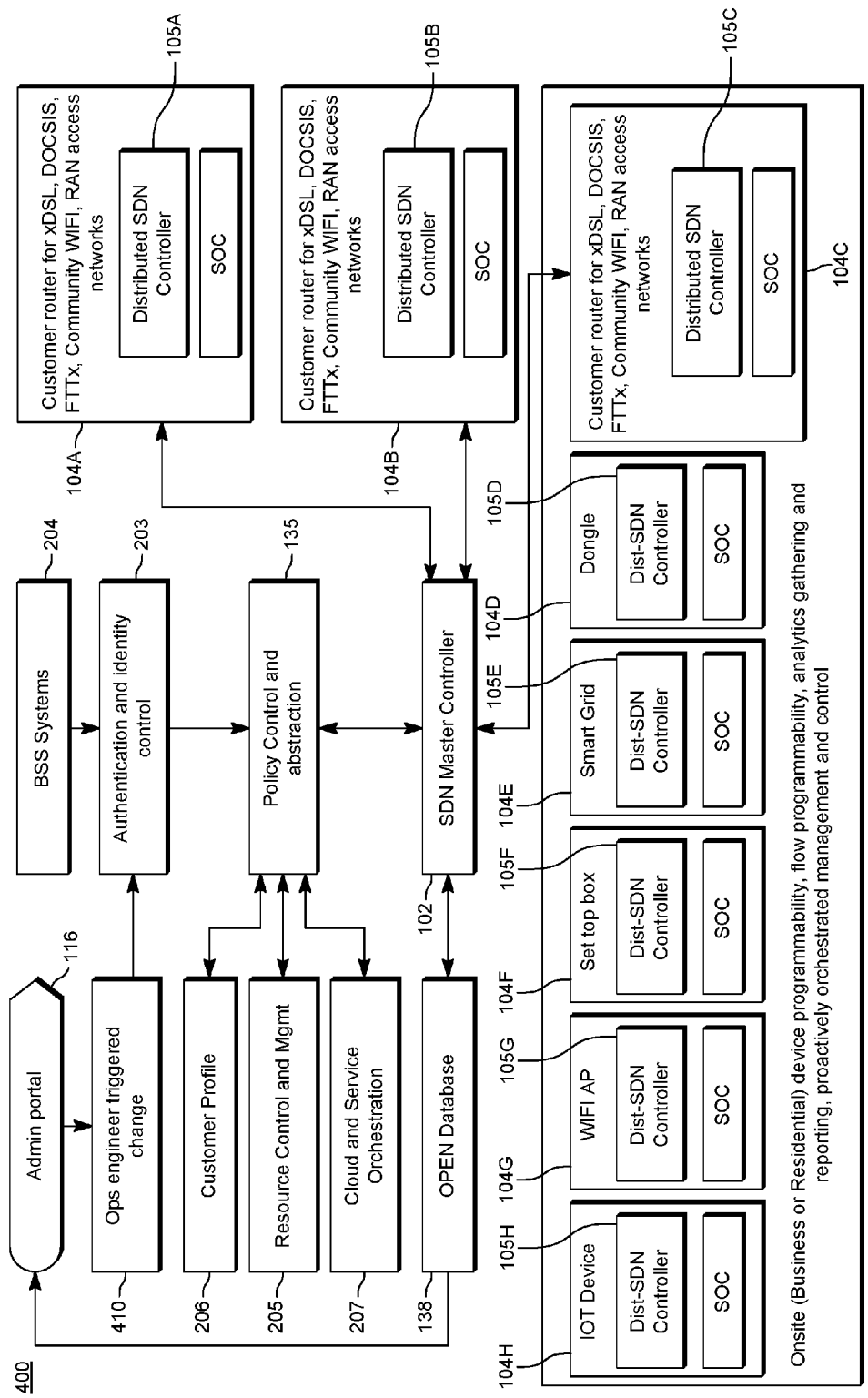
FIG. 11 is a block diagram illustrating another exemplary SDN platform in accordance with the present teaching.

Referring to FIG. 11 there is illustrated another SDN platform 400 which is also in accordance with the present teaching. The SDN platform 400 is substantially similar to the SDN platform 100 and like components are indicated by similar reference numerals. The main difference is that only one portal is provided, namely administration portal 118, which allows an operator to trigger a change to the policy and/or control data, step 410. The change of policy and/or control data are implemented on the CPE 104A-104H by the co-controllers 105 in a manner as previously described. Otherwise the operation of the SDN platform 400 operates in a similar fashion to the SDN 100.

Figure 12A:
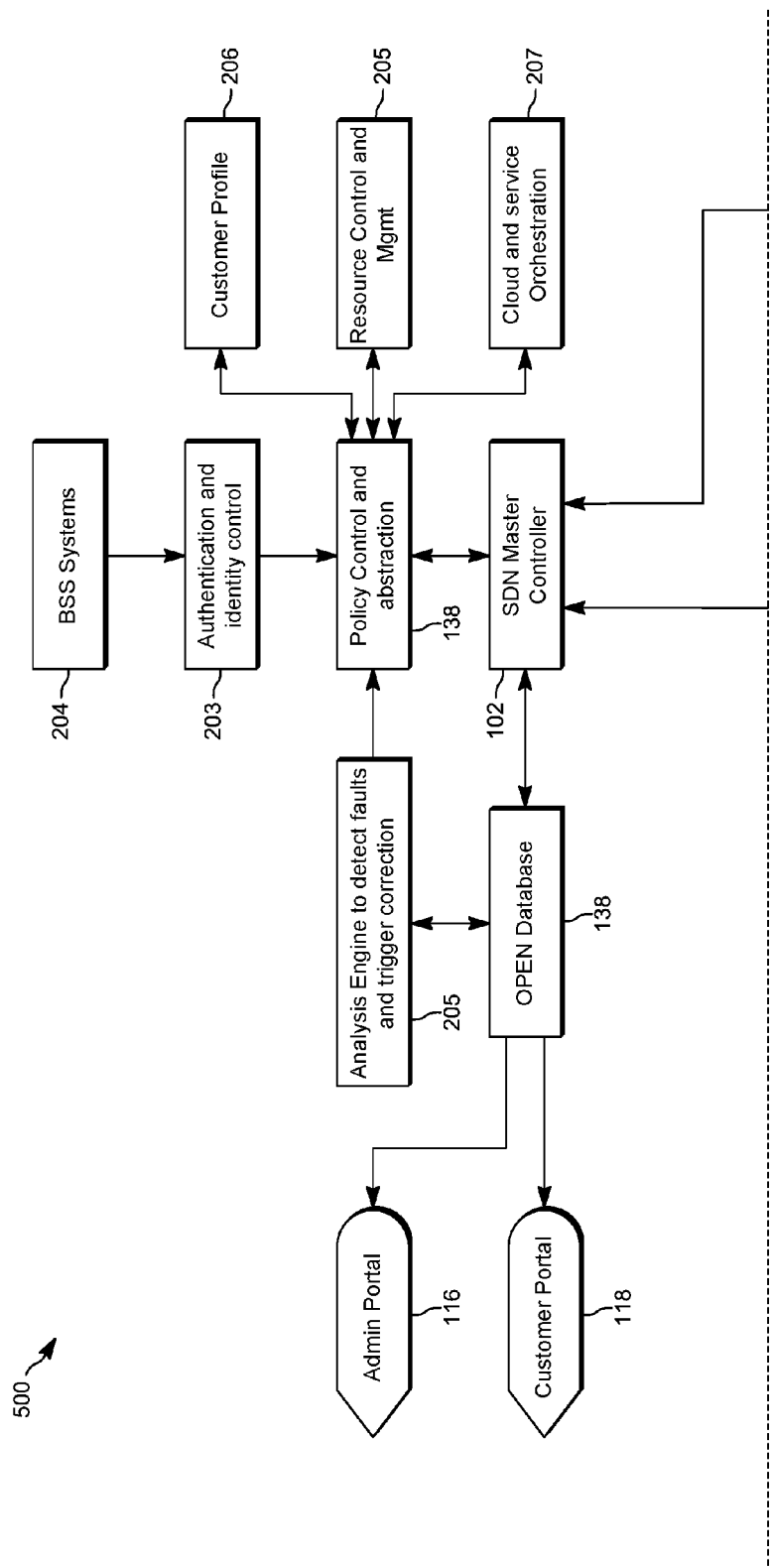
FIGS. 12A and 12B are block diagrams illustrating another exemplary SDN platform in accordance with the present teaching.
Figure 12B:
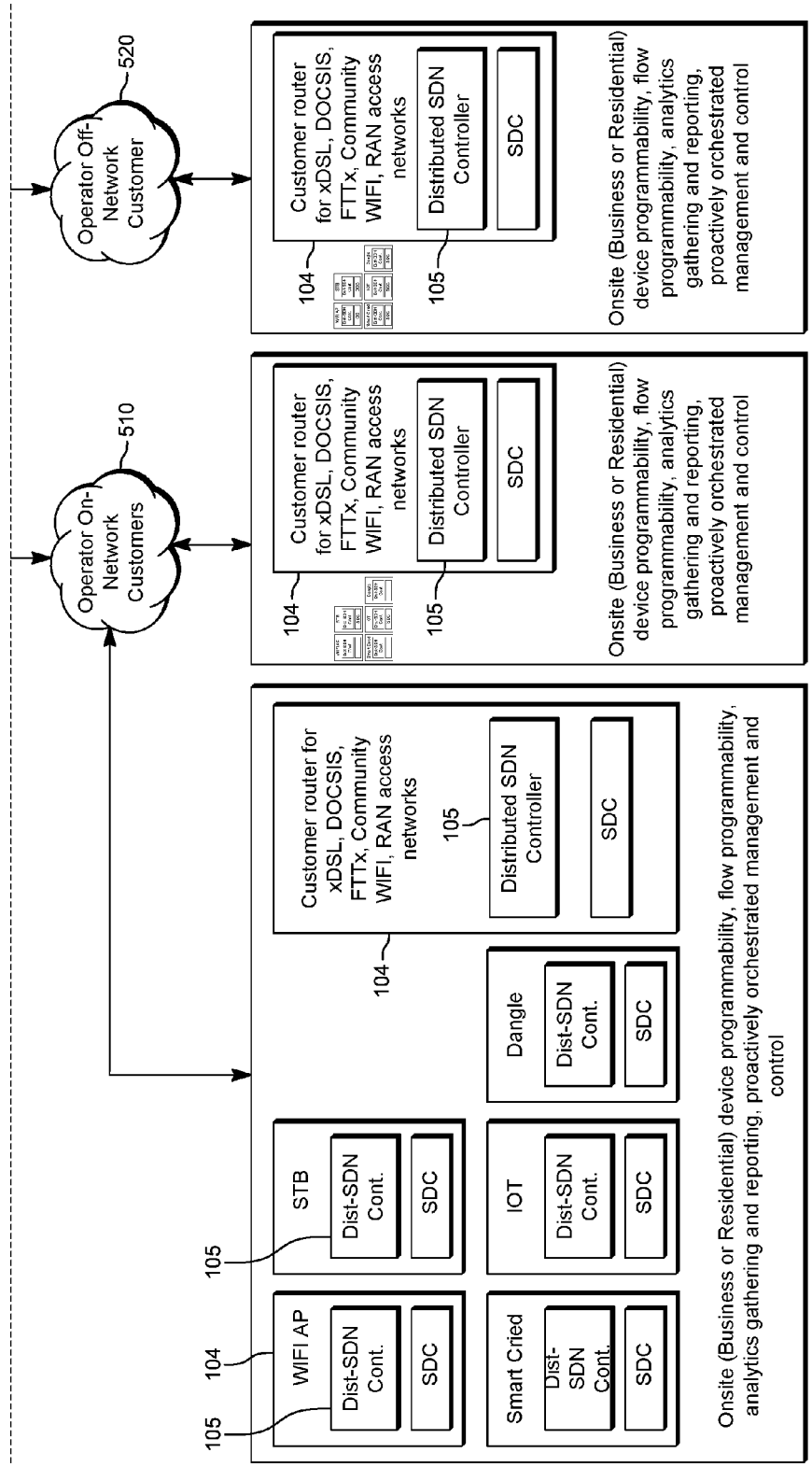

Referring to FIG. 12 there is illustrated another SDN platform 500 which is also in accordance with the present teaching. The SDN platform 500 is substantially similar to the SDN platform 100 and like components are indicated by similar reference numerals. The main difference is that the co-controllers 105 are distributed to CPEs 104 on two separate networks, namely, first network 510 and second network 520. Otherwise the operation of the SDN platform 500 operates in a similar fashion to the SDN 100.

Figure 13:
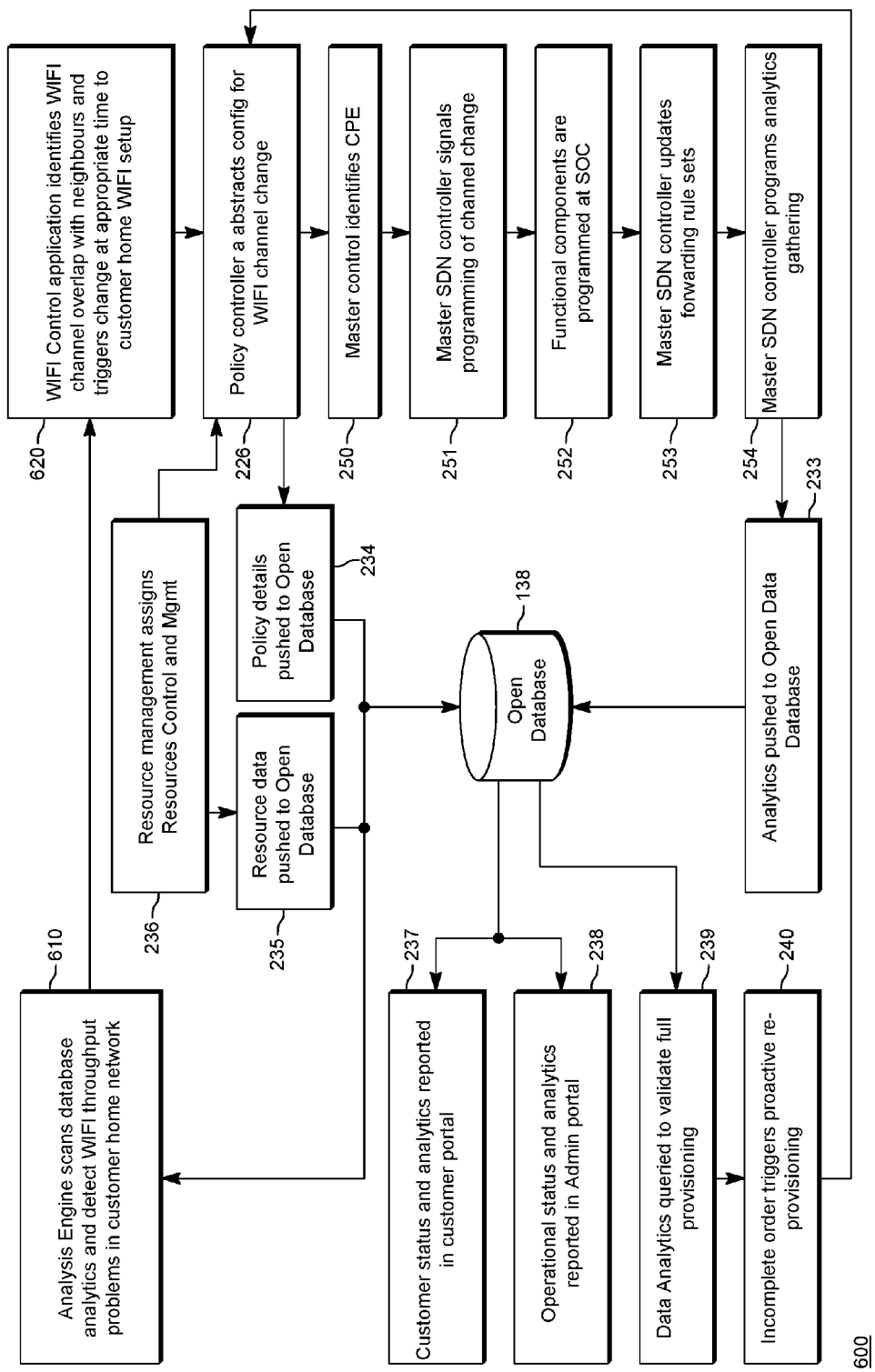
FIG. 13 is a flow chart illustrating exemplary steps during the operation of the SDN platform of FIG. 1, FIG. 5, FIG. 11, or FIGS. 12A and 12B.

Referring to FIG. 13 which illustrates another flowchart showing exemplary steps of the SDN platform in operation which is also in accordance with the present teaching. The flow chart of FIG. 13 is substantially to the flow chart of FIG. 9 and like elements are identified by similar reference numerals. In this exemplary embodiment, the analysis engine 205 scans the analytics stored in the database 138 which have been haverested from the CPEs 104 by the co-controllers 105. The analysis engine is operable to detect WIFI throughput problems in a customer's home network, step 610. A WIFI control application is in communication with the analysis engine and is operable to interpret the output from the analysis engine. In this example, the WIFI control application identifies a WIFI channel overlap with neighbours and triggers a change to the customer's home WIFI setup at an appropriate time by modifying policy/configuration data for the customer, step 620. The policy control engine 135 abstracts configuration data for a WIFI channel change, step 226. The change of configuration is implemented on the WIFI router by the appropriate co-controllers 105 in a manner as previously described. In this example, the SDN platform seamlessly updates the WIFI channel without requiring any input from the user. The remaining steps are similar to those previously described with reference to FIG. 9.

Figure 14:
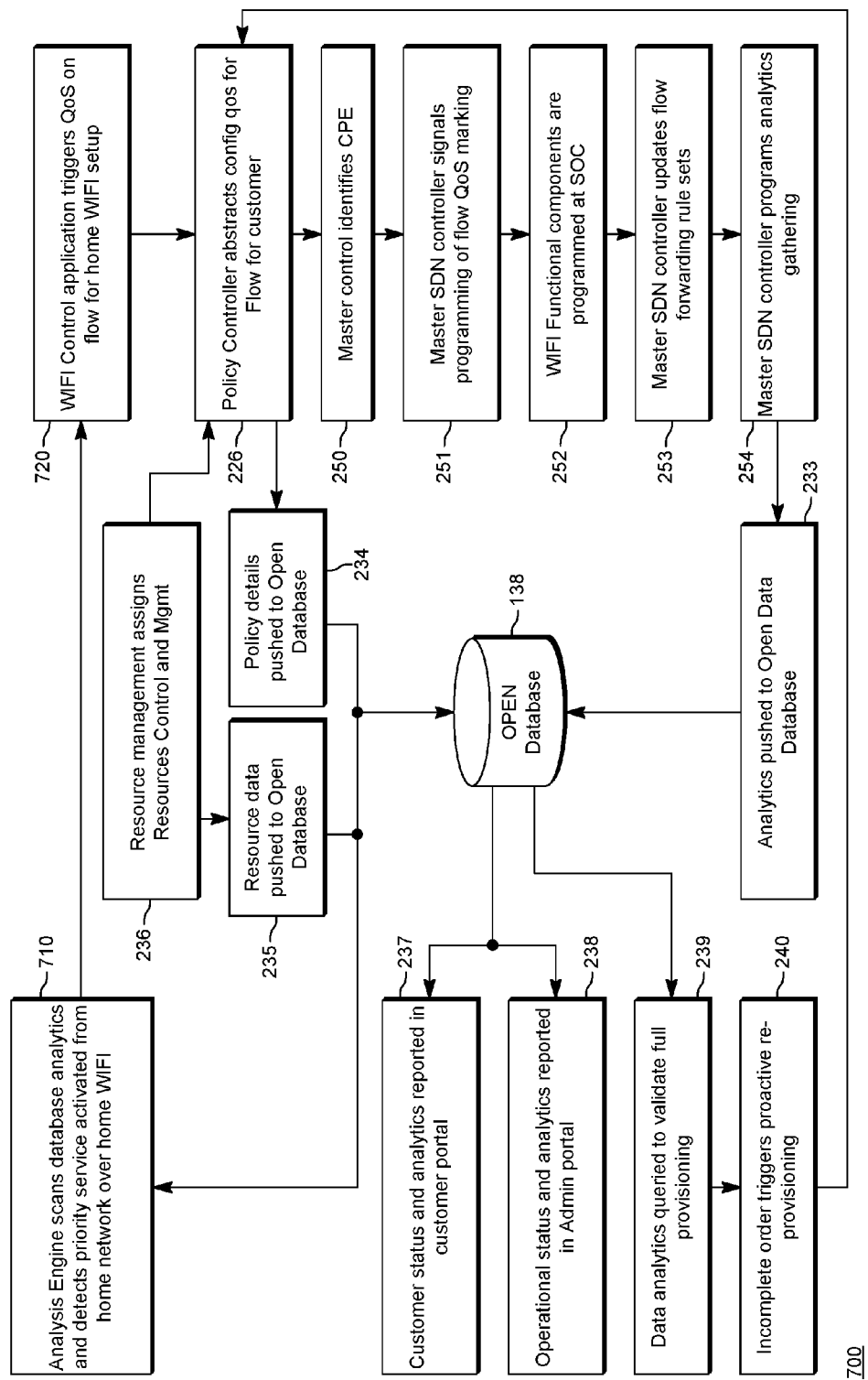
FIG. 14 is a flow chart illustrating exemplary steps during the operation of the SDN platform of FIG. 1, FIG. 5, FIG. 11, or FIGS. 12A and 12B.

Referring to FIG. 14 which illustrates another flowchart showing exemplary steps of the SDN platform in operation which is also in accordance with the present teaching. The flow chart of FIG. 14 is substantially to the flow chart of FIG. 9 and like elements are identified by similar reference numerals. In this exemplary embodiment, the analysis engine 205 scans the analytics stored in the database 138 which have been haverested from the CPEs 104 by the co-controllers 105. The analysis engine 205 is operable to detect selected priority services activated from a home network over general home WIFI, step 710. The selected priority service may assign a higher bandwidth limit to certain devices over other devices. A WIFI control application is in communication with the analysis engine and is operable to interpret the output from the analysis engine 205. In this example, the WIFI control application triggers quality of service changes to the customer's home WIFI setup by modifying policy/configuration data for the customer, step 720. The policy control engine 135 abstracts configuration data for a QoS change, step 226. The master controller 102 identifies the appropriate CPE 104 that requires reconfiguration in view of the QoS change, step 250. The change of configuration is implemented on the appropriate CPE 104 by the appropriate co-controllers 105 in a manner as previously described. The remaining steps are similar to those previously described with reference to FIG. 9.

Figure 15:
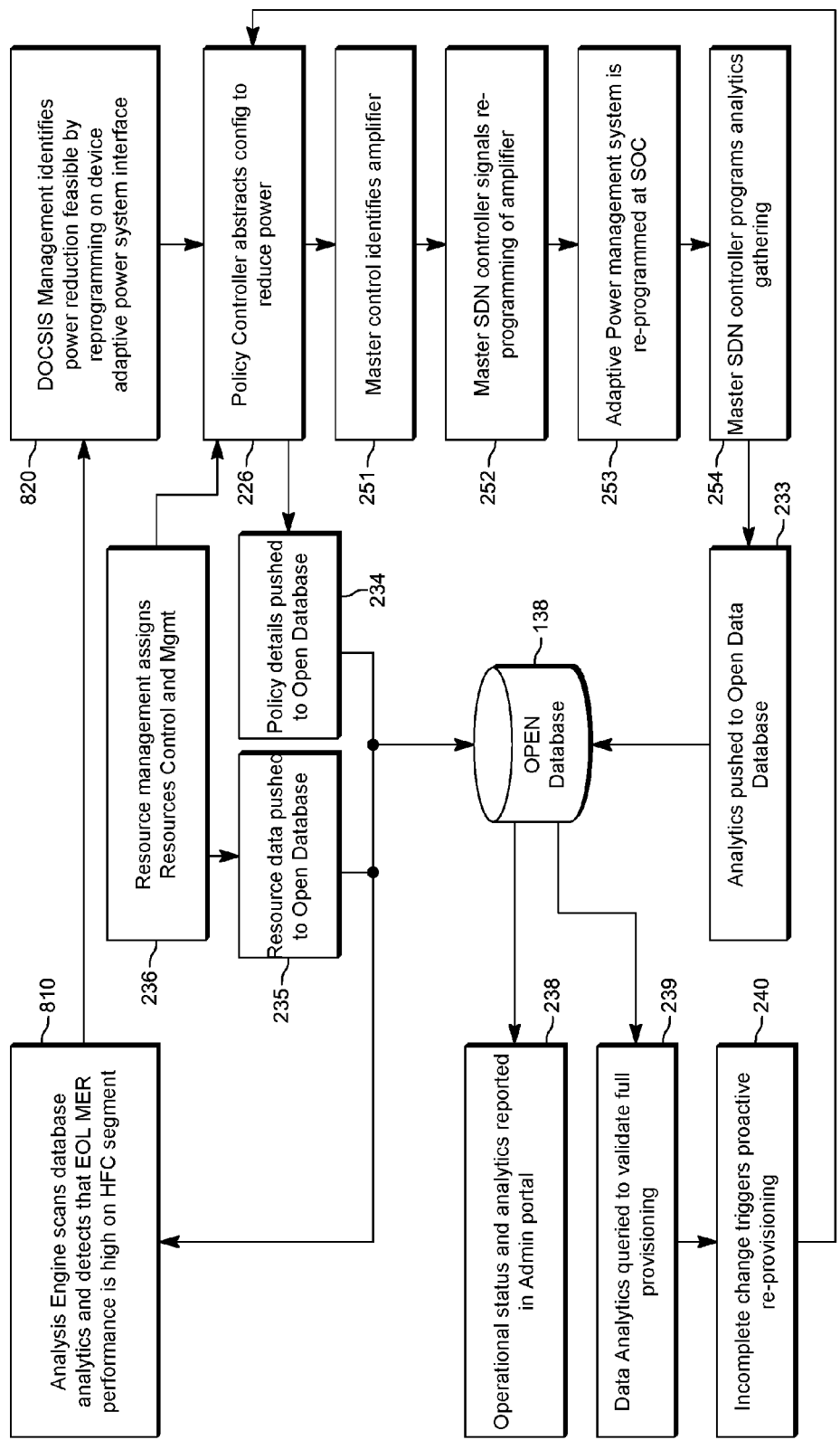
FIG. 15 is a flow chart illustrating exemplary steps during the operation of the SDN platform of FIG. 1, FIG. 5, FIG. 11, or FIG. 12A and 12B.

Referring to FIG. 15 which illustrates another flowchart showing exemplary steps of the SDN platform in operation which is also in accordance with the present teaching. The flow chart of FIG. 15 is substantially to the flow chart of FIG. 9 and like elements are identified by similar reference numerals. In this exemplary embodiment, the analysis engine 205 scans the analytics stored in the database 138 which have been haverested from the CPEs 104 by the co-controllers 105. The analysis engine 205 is operable to detect that the end of line (EOL) modulation error rate (MER) performance is high on the hybrid fiber coaxial (HFC) segment. A DOCSIS management application is in communication with the analysis engine and is operable to interpret the output from the analysis engine 205. In this example, the DOCSIS management application identifies that power reduction is feasible by reprogramming a power interface of the CPEs 104. The policy control engine 135 abstracts configuration data for implementing the reduction in power, step 226. The master controller 102 identifies the appropriate amplifier 104 that requires reprogramming to implement power reduction. The change of configuration is implemented on the appropriate amplifier by the appropriate co-controllers 105 in a manner as previously described. The remaining steps are similar to those previously described with reference to FIG. 9.

Figure 16A:
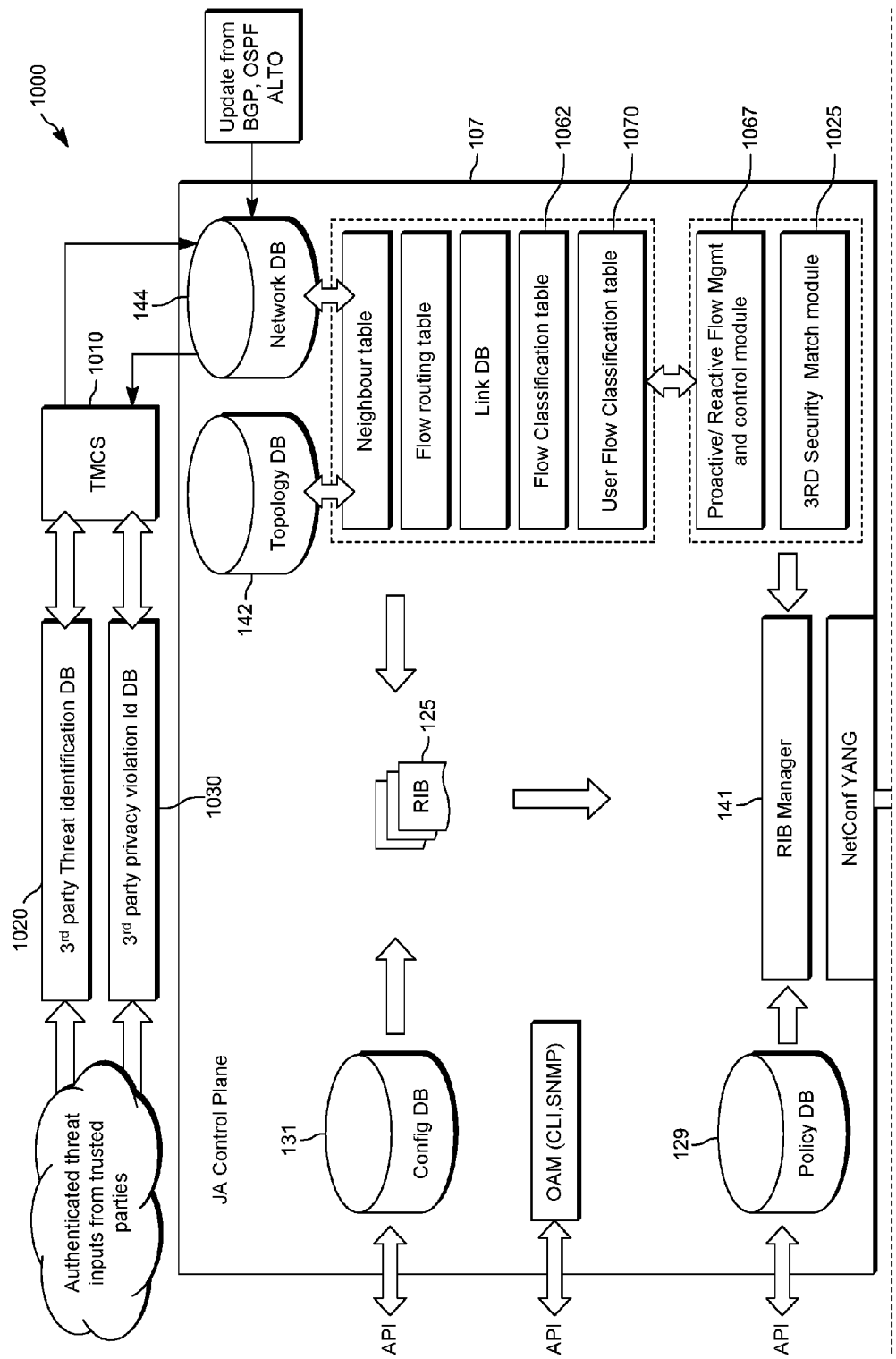
FIGS. 16A and 16B are block diagrams illustrating details of an SDN architecture which is also in accordance with the present teaching.
Figure 16B:
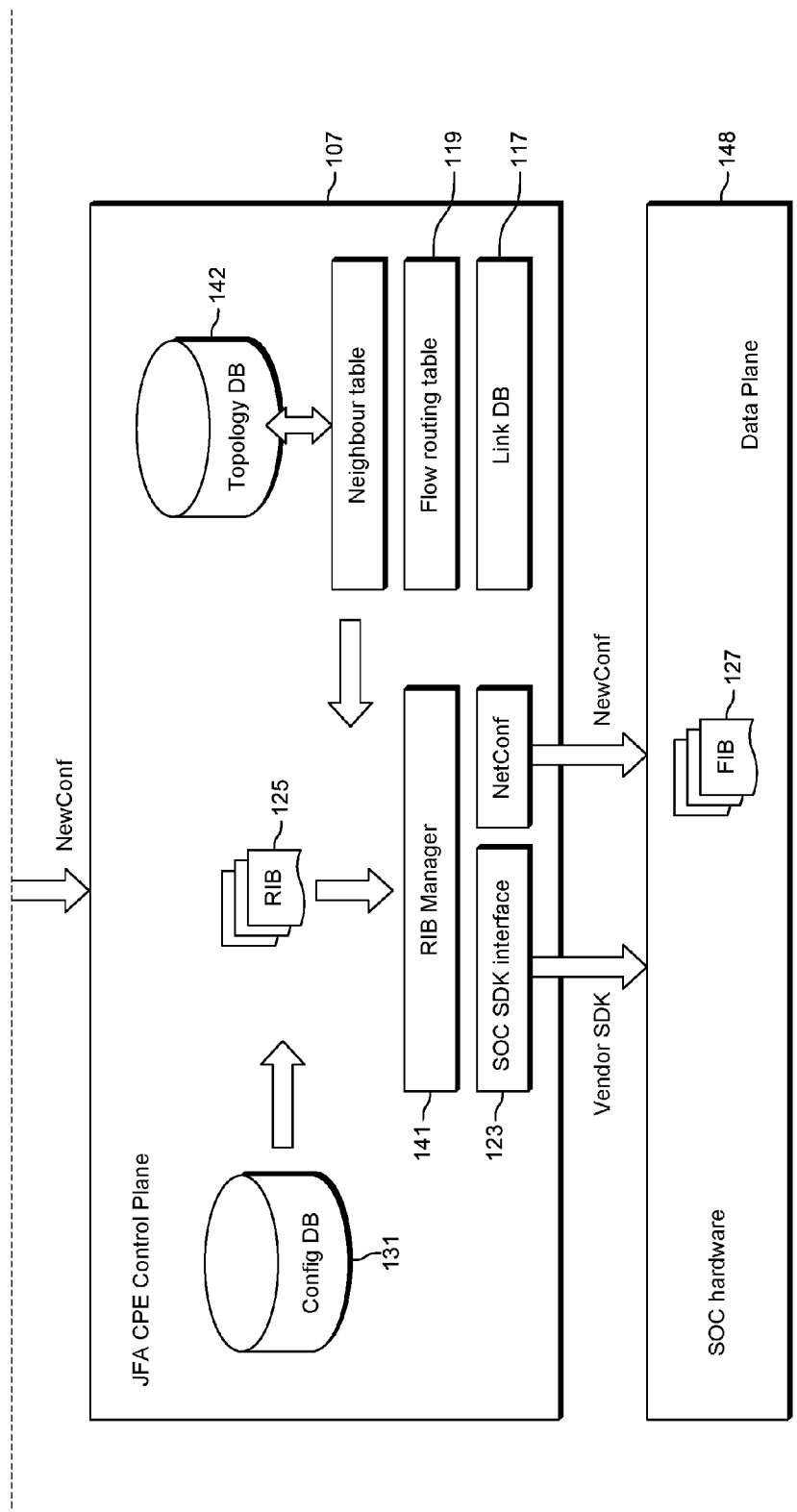
Figure 18:
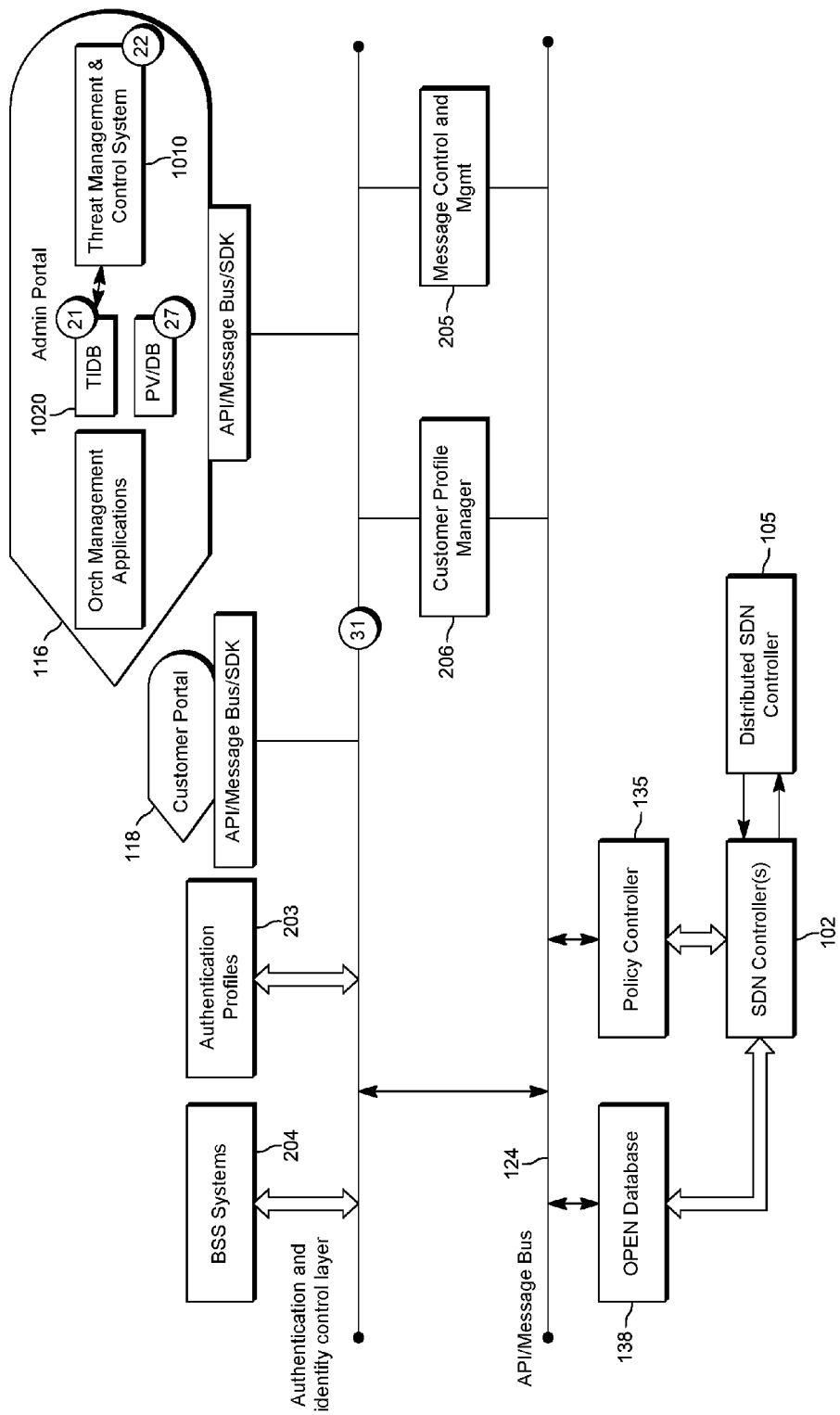
FIG. 18 is a block diagram illustrating details of the SDN architecture of FIG. 16.

An exemplary architecture 1000 in accordance with the present teaching is illustrated in FIGS. 16, 17 and 18. The architecture 1000 enables security threats and privacy violations to be addressed by leveraging the programmability of flow control on SDN devices to identify and to not forward identified traffic which contain threats or privacy violations. Flow based forwarding is programmed on the end user device 104 to limit the forwarding of threat traffic or privacy violation traffic. FIGS. 16-17 include many similar components previously described with reference FIGS. 3-5 and like elements are indicated by similar reference numerals. These like elements operate in a similar fashion as previous described. The architecture 1000 includes a master SDN controller 102 configured for managing data flow control on the SDN network. The master SDN controller is operable to generate routing data for the networked devices 104. The master SDN controller 102 is configured to generate a plurality of discrete co-controllers 105 each associated with a particular end user. Each SDN co-controller 105 includes routing data for an associated networked device 104. The SDN co-controller 105 are dispatched by the master SDN controller 102 to the networked devices 104 associated with the respective end users for controlling thereof. The networked devices 104 may request access to a destination on the SDN network, for example, a uniform resource locator (URL). In response a domain name system (DNS) 1035 initiates an interaction with the requesting networked device 104. The DNS 1035 relays the DNS data associated with the requested URL to a threat management control system (TMCS) 1010. The TMCS 1010 is configured to determine if the requested URL has an associated security criteria. The TMCS 1010 communicates the threat status to the SDN co-controller 105 associated with the requesting networked device 104. The SDN co-controller 105 is operable to generate routing data for the requesting networked device 104 on which it is installed based on the threat status to allow or deny access to the requested URL.

In the exemplary embodiment the TMCS 1010 is in communication with a threat identification database (TIDB) 1020 and a privacy violation identification database (PVIDB) 1030. The TIDB 1020 stores particulars of destinations which are classified as having a malicious threat criteria associated with them. The PVIDB 1030 stores particulars of destinations which are classified as having a privacy threat associated with them. For example, such destinations are known to harvest private data from users without the user knowledge. The TMCS 1010 is configured to process and validate the destination requests against the threat identication database (TIDB) 1020 and the PVIDB 1030 and is operable to ensure that users do not connect to malicious destinations. For example, malicious destinations may include suspect websites, content delivery networks (CDN)s, website and CDN IP addresses, domains, URLs etc. The TMCS 1010 permits for the acceptance and inputs from a DNS query where it then checks and validates the user and applies the rules of associated with a user profile. Once the TIDB 1020 has been queried for a particular route and the user profile validated against it the TMCS 1010 communicated with the SDN orchestration system database 138. The master SDN controller 102 then propagates a message to the SDN co-controller 105 on the CPE 104 with a appropriate routing data for the requesting device 104. A SDN security match module 1025 within the device 104 validates whether the route is to be applied. If it is to be applied then a forwarding entry is inserted by the SDN co-controller 105 in the forwarding table, otherwise an entry is included to forward the traffic to a quarantine destination. The TMCS 1010 reports to the databse 138 such that data may be extracted and used for reporting threats and/or privacy violations to the customer portal 118 and/or the administration portal 116.

The TIDB 1020 may be a private internet security companies database which stores data on dangerous and suspect websites, CDNs, website and CDN IP addresses, domains, URLs etc. This data is gathered by various companies and organizations around the world on known threats concerning security topics around anti-phishing, malware and domain control etc. Such databases are already in use by government security agencies, financial service firms, and e-commerce, technology companies, social networking and Internet Service Providers (ISPs) to help support themselves in the fight against attacks.

The function of the PVIDB 1030 is to store data on internet companies who use their applications to harvest private data from users once the applications are installed on end user devices 104. This is specifically relevant for where an internet service or product being supplied by an internet company does not comply with local regulations for the individual countries on the gathering of data from a subscriber. The PVIDB 1030 may be an extension of the TIDB 1020 or a separate system. The function of the PVIDB 1030 is to ensure that the consumer are protected against privacy violations from companies who do not comply to certain criteria, for example, expectations of decency and local regulations by blocking all traffic from subscriber of the platform 1000 to their systems on a flow basis. The PVIDB 1030 permits subscribers to decide what data they may wish to send to the internet instead of on-net parties deciding for themselves what they will take, irrelevant of whether the customer is aware or not.

The architecture 1000 utilises a highly resilient control layer 107 which faciltiates the distribution of control through a federation of distributed SDN co-controllers 105. Each customer is able to select a security and/or a privacy policy by selecting configuration options via the customer portal 118 and this is then transmitted using an API 120 or the SDK 122 through the control plane 107 where the user is first authenticated by authenitcation module 203 before a policy is applied by the policy controller 135 for known IP address and devices which are gathered from the databases 1020, 1030. The policy controller 135 abstracts the appropriate policy and applies the policy to the distributed SDN co-controllers 105 which are installed on the devices 104.

Figure 19:
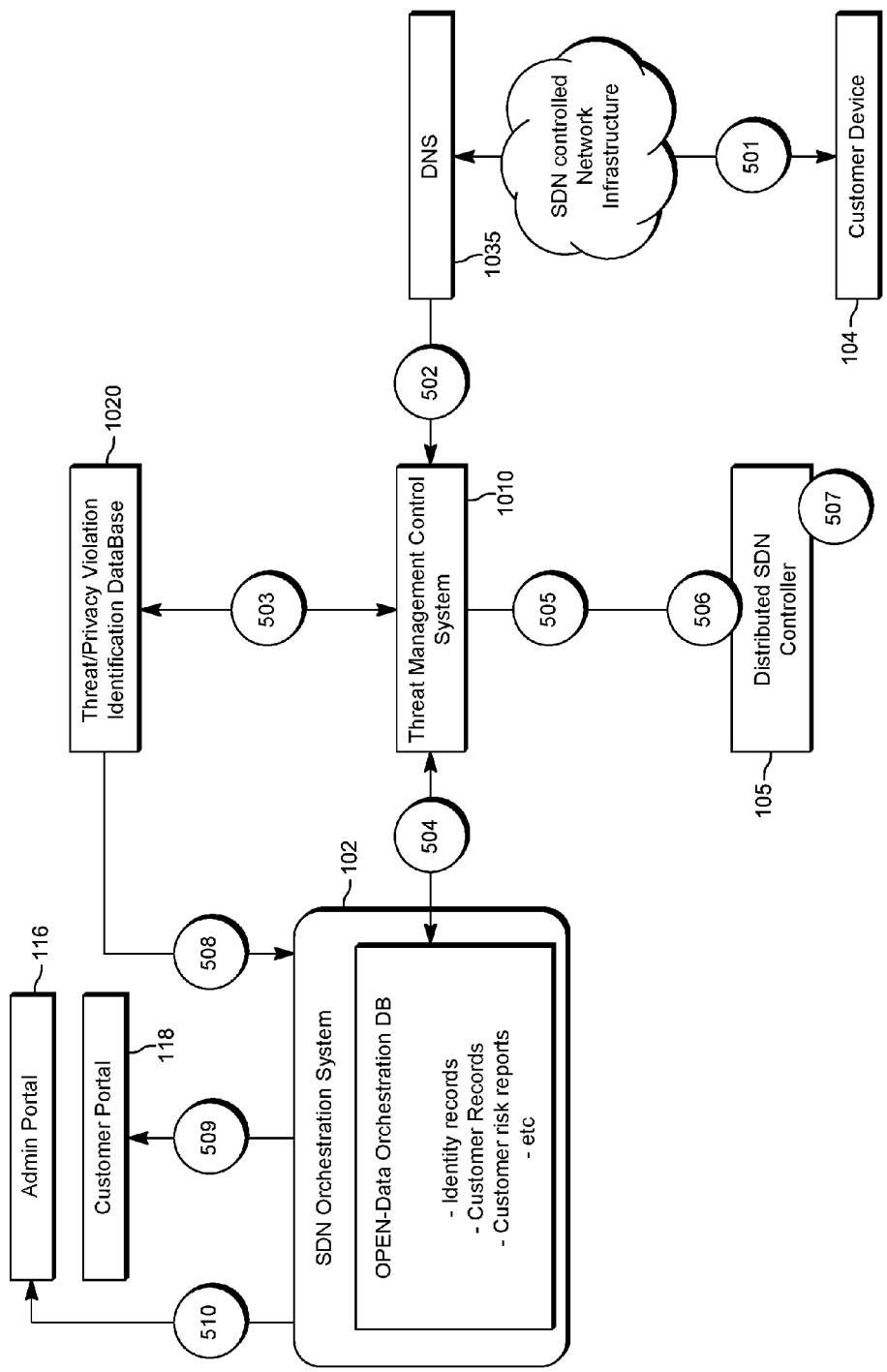
FIG. 19 is a flow diagram illustrating exemplary steps during the operation of the SDN platform of FIGS. 16A, 16B and 17-18.

FIG. 19 illustrates a flow chart detailing exemplary steps implemented by the architecture 1000. In this exemplary example, a customer device 104 requests access to a URL. This request to a URL may be triggered by the customer themselves or it may be triggered by traffic generated by Adware, Malware, BotNet, privacy violation , traffic on the users device 104. In this scenario a DNS query/response interaction is initiated between a subscriber application on the device 104 and an operator's domain name system (DNS) 1035, step 501. The DNS 1035 initiates a lookup up process and also transmits a message containing a subscriber IP, destination IP and URL over a secure API to the TMCS 1010, step 502.

The receipt of the message from the DNS 1035 triggers the TMCS 1010 to query the PVIDB 1030 and/or TIDB 1020 (or cache) to identify if the URL contained in the message has a threat/privacy status associated with it, step 503. The TMCS 1030 may also request the subscriber identity classification in order to validate the user profile classification, step 504. Upon receipt of a response from the TIDB 1020 and the PVIDB 1030 (user identification and classification) and (security/pricay classification), step 503, the TMCS 1010 sends the SDN co-controller 105 the URL threat status and customer classification, step 505. Table 1 and table 2 define exemplary definitions of the user and risk classifications identifiers which may be transmitted between the various systems to aid an understanding of the nature of the attack type and to define what expectations exist for the control of the traffic belonging to the end customer. The information provided in table 1 and table 2 are provided by way of example only and it is not intended to limit the present teaching to the exemplary values provided.

risk classification identifier to the database 138. The database 138 uses the IP address of the subscriber to map the security alert report to the customer record. This data is then imported into the relevant customer portal 118 to indicate a summary of the necessary security/privacy action that may be taken to alleviate the threat.

In addition to provide fuller information on the security/privacy risk the risk classification is analysed against the TIDB 1020, step 509, and a full detailed report may be generated on the risk which is reported to the customer portal 118. The detailed report includes information extracted from the database 138. The database 138 uses the IP address of the subscriber to map the security alert report to the customer record. In addition the detailed report may

TABLE 1

Examplanary Threat/Privacy Violation classification

| Risk type | Definition | Traffic Type | Classification |
|---|---|---|---|
| Infection | Virus | Outbound Virus generated traffic | #A |
| User Under Attack | DDOS, BotNet, port scan | Inbound DOS traffic | #B |
| User data theft | Adware, Malware, etc | Outbound traffic | #C |
| User initiating attack | DDOS, port scan, BotNet | Outbound DOS traffic (user joining BotNet due to infection) | #D |
| Privacy Violation | Adware, Malware, etc | Outbound traffic | #E |
| Toxic Website | Website identified by TIDB as risky | Incoming traffic | #F |
| Toxic CDN | CDN identified by TIDB as risky | Incoming traffic | #G |
| Phished website | Website identified as being hijacked | User trying to access websites which have been hijacked | #H |
| Infrastructure under attack | Operator device under attack | Incoming traffic | #J |
| Privacy Violation traffic | Identified destination for invasive companies traffic | Outbound traffic | #K |

TABLE 2

Examplanary User profile classifications

| User profile classification | Action | Flow Classifications |
|---|---|---|
| Very limited internet access as per white list generated by TIDB | TMCS applies profile 1 | #1 |
| Medium internet access as per white list generated by TIDB | TMCS applies profile 2 | #2 |
| User defined TOD Domains to be blocked | TMCS applies profile 2 with TOD | #3 |
| Adult with security protection | TMCS applies profile 4 | #4 |
| No protection, completely open | TMCS applies profile 5 | #5 |
| Permitted to communicate only with authenticated users | TMCS applies profile 2 + blocking of incoming calison approved communications applications (one for us to discuss with SKYPE) | #6 |
| Tunnel blocking | TMCS applies profile X + profile 7 | #7 |
| Privacy violation | TMCS applies profile 8 | #8 |

The SDN co-controller 105 has a security match module 1025 which is operable to define the appropriate forwarding decision in the device 104 for the user profile dependant on the risk classification, step 506. The forwarding decision may be to send the traffic to a quarantine destination (black-holed) or to permit the traffic to be forwarded to the destination as requested by the user. The SDN co-controller 105 then sets a forwarding entry in the flow routing table 119, step 507, against the requesting subscriber IP address dependant on the information received from step 506. If the URL is indicated as a risk site the TMCS 1010 generates a report, step 508, which is entered in the open database 138 which may be accessed by the customer via the customer 118. The report may be signalled by transmitting the IP address of the subscriber, the user profile identifier and the identify the risk, describe the effects of the risk and what action should be taken to address it.

The administration portal 116 is operable to compute regular security/privacy reports by running queries against the open database 138, step 510. These reports can also be accessed by the ISPs product, marketing and sales teams to permit them to create new products, to create promotions on the dangers of not being protected and to target individuals with promotions who are seriously infected. For the ISP a sales promotion may be used to get a customer to clean up their systems therefore removing unnecessary load from the network and to create marketing trend about the ISP itself being a safe network provider.

Figure 20A:
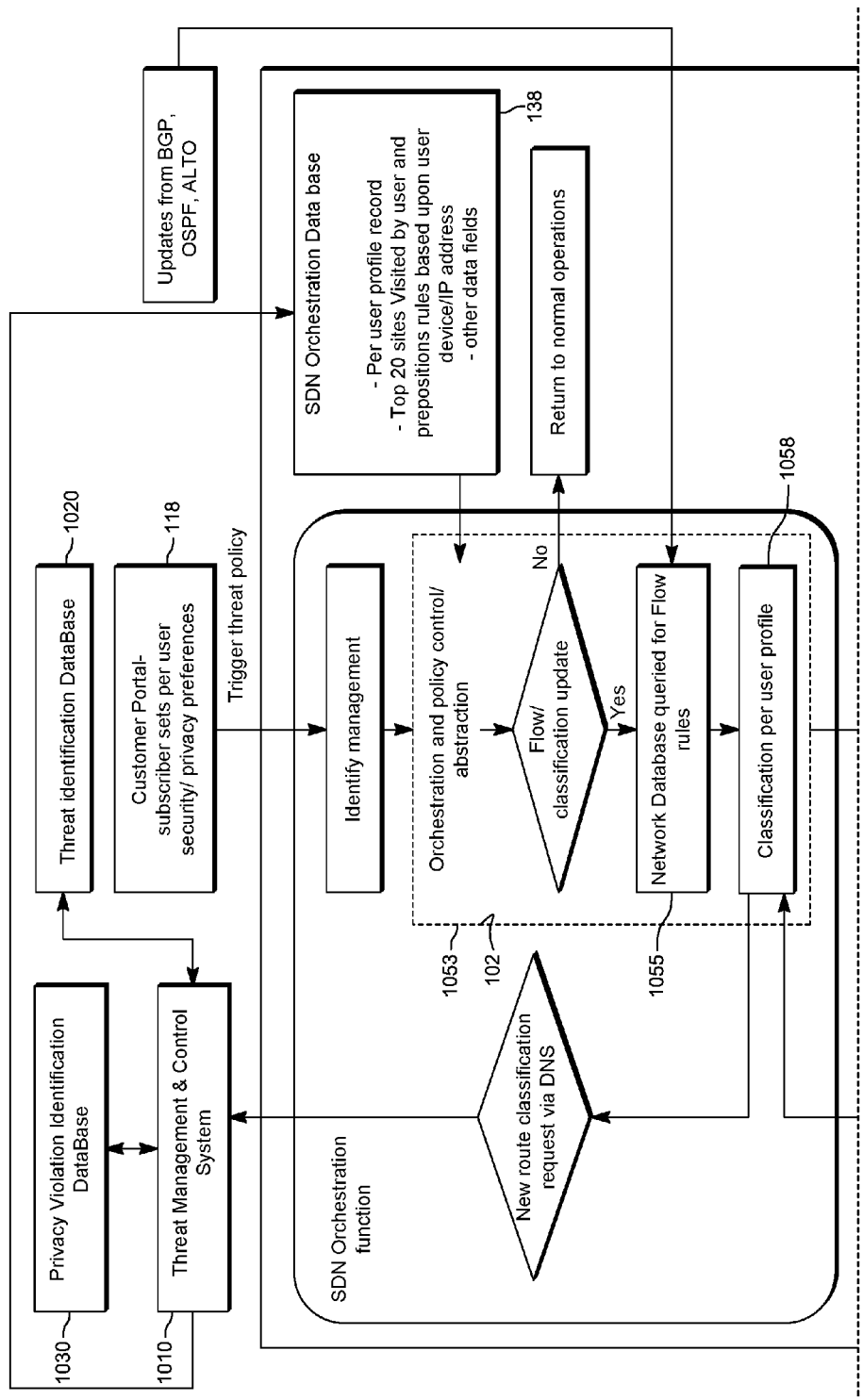
FIGS. 20A and 20B are flow diagrams illustrating exemplary steps during the operation of the SDN platform of FIG. 16A, 16B and 17-18.
Figure 20B:
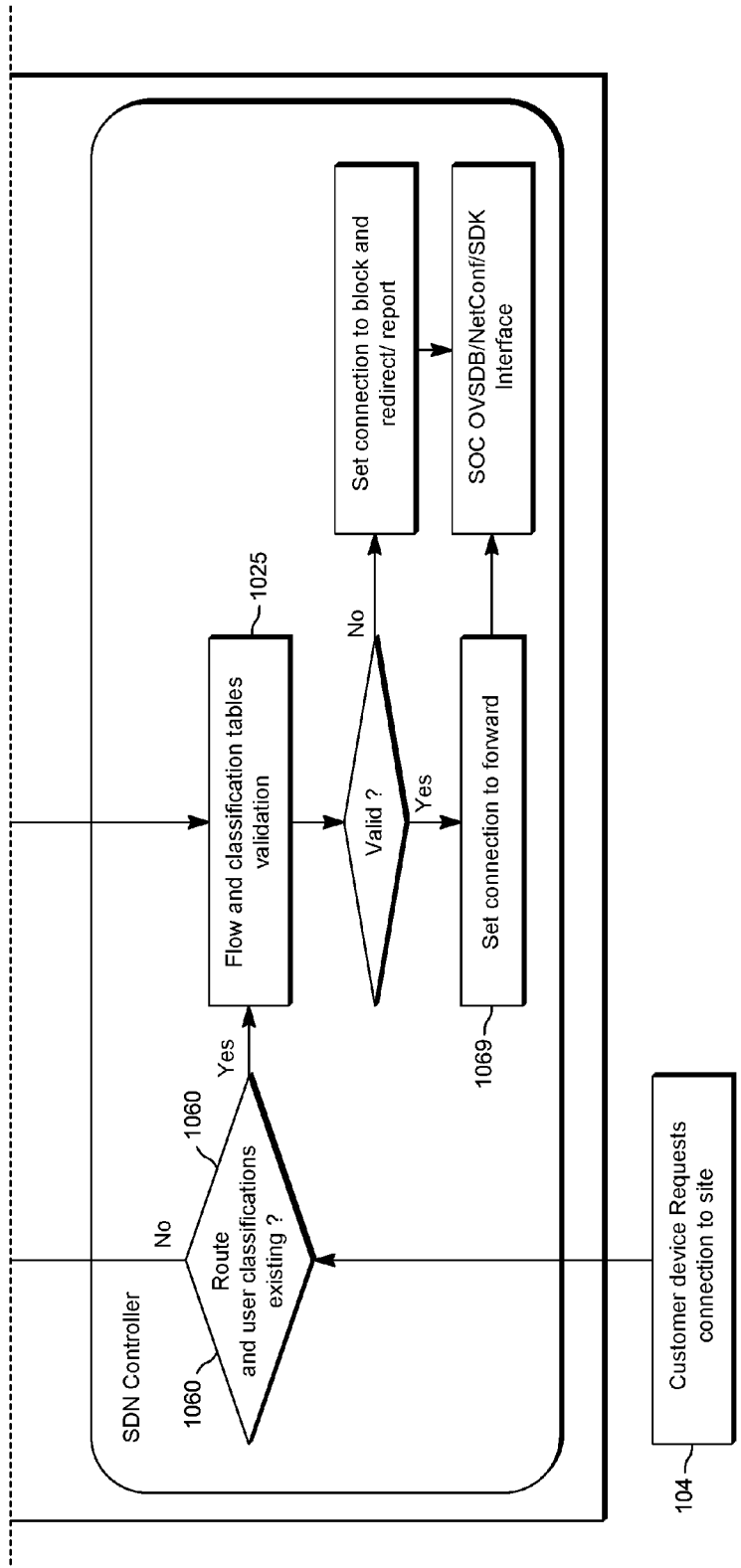

An exemplary work flow in accordance with the present teaching is illustrated in FIGS. 20A and 20B. The customer identifies the policy on a per user basis through configuration options provided in the customer portal 118 through the orchestration control layer 107 where the user is first authenticated and a policy is then applied, block 1053. For this policy to be applied data is extracted e.g. IP address and device ID, security or privacy policy chosen by customer via customer portal 118 from the open database 138. Also extracted from the open database 138 is a list of well known and commonly used sites by the customer. These forwarding entries are collated, block 1055 and classified, block 1058, before being communicated from the master SDN controller 102 to the SDN co-controller 105, block 1060. The SDN security match module 1025 matches for both privacy and threats, block 1062. The security match module 1025 matches the customer profile identifier in the user flow classification table 1065 against the risk and then a control module 1067 sets the forwarding path, block 1069, according to the decision made by the SDN security match module 1025. The flow classification table 1062 stores the threat classification as per the examples identified in Table 1. The user flow classification table 1070 stores the user profile classification as per the examples identified in Table 2.

Figure 21A:
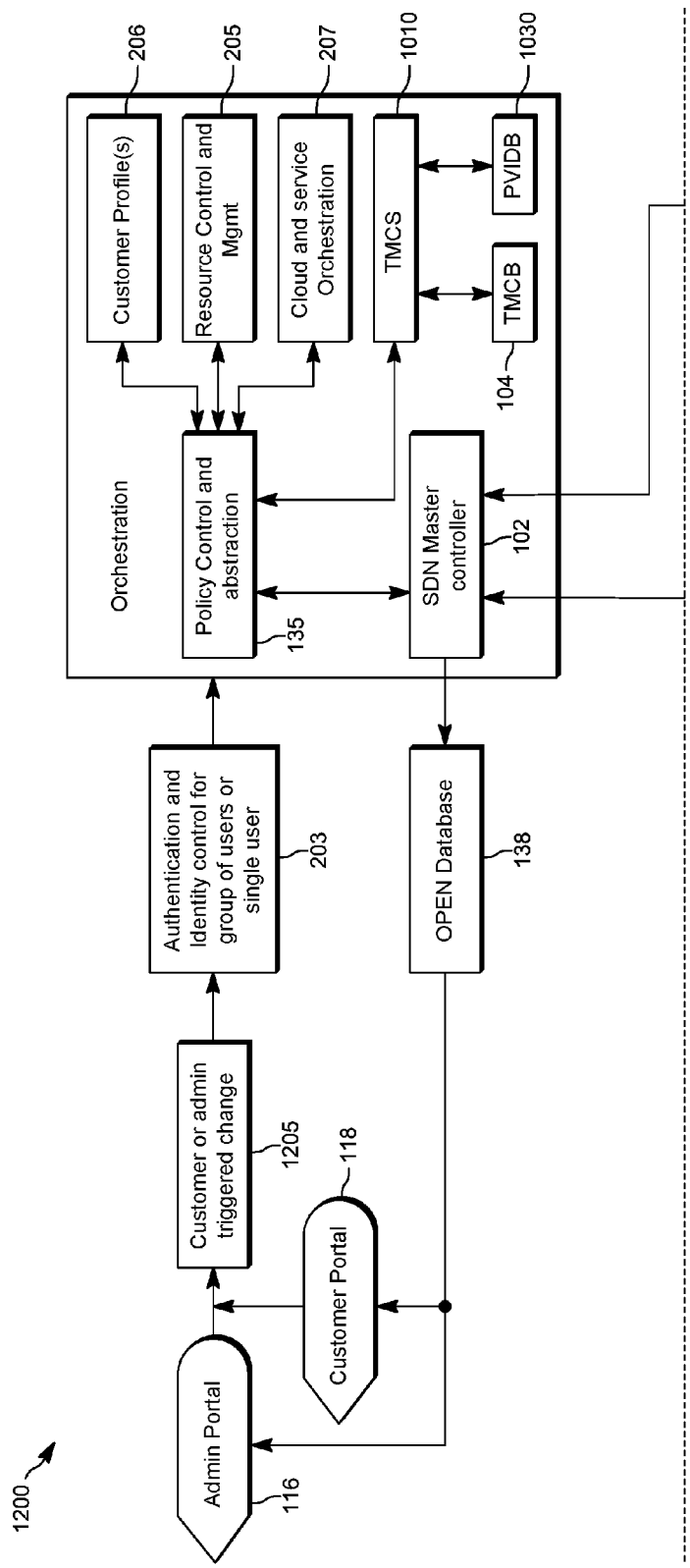
FIGS. 21A and 21B areblock diagrams illustrating details of an SDN architecture which is also in accordance with the present teaching.
Figure 21B:
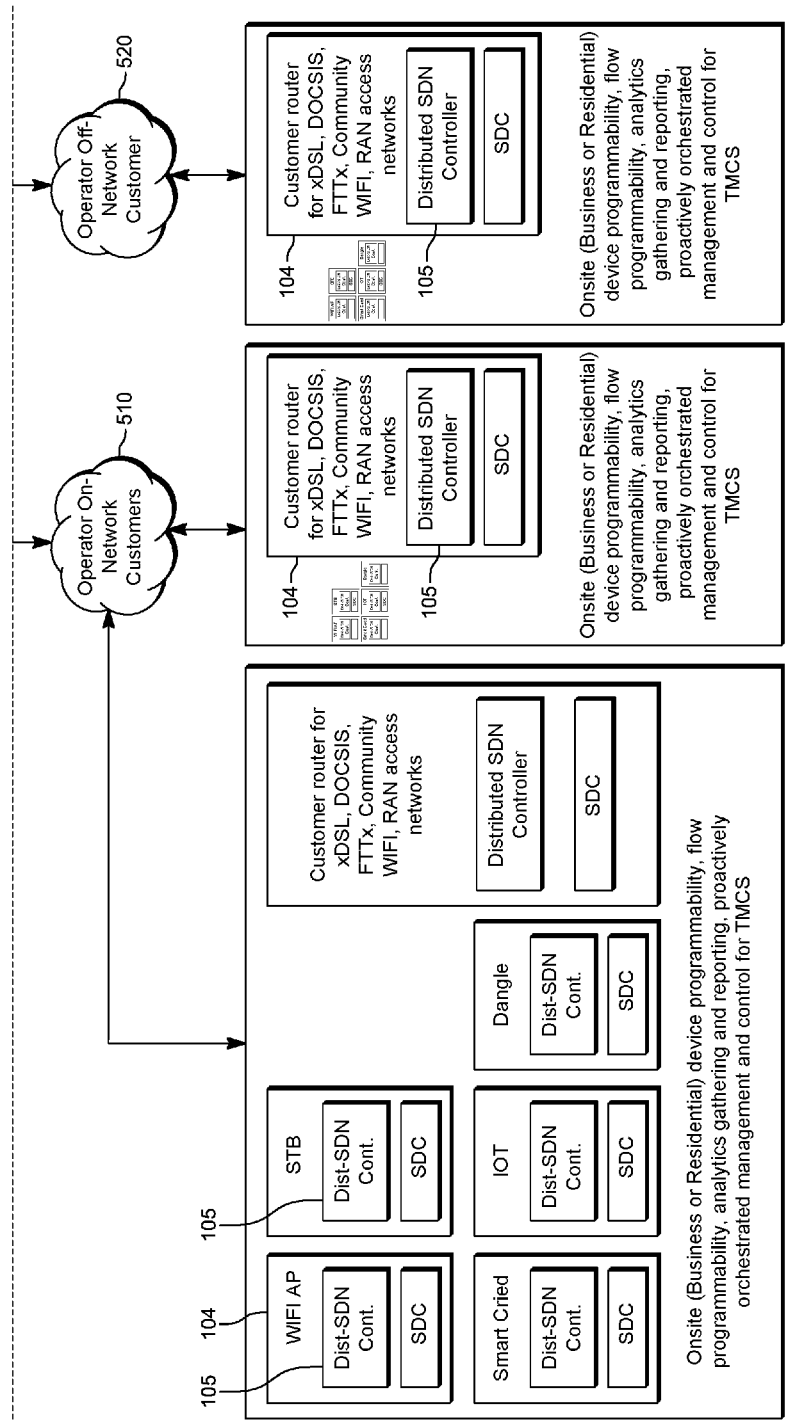

Referring to FIGS. 21A and 21B there is illustrated another SDN platform 1200 which is also in accordance with the present teaching. The SDN platform 1200 is substantially similar to the SDN platform 500 of FIGS. 12A and 12B and like components are indicated by similar reference numerals. The main difference is that that the SDN platform 1200 includes the TMCS 1010, TIDB 1020 and the PVIDB 1030 as described with reference to FIGS. 16A, 16B, 17-19, 20A, 20B, 21A and 21B. The SDN platform 1200 illustrates the flow process implemented when a customer triggers a change in block 1205 to the threat or privacy policy that is applied to the settings used to protect their home/business. FIGS. 21A and 21B illustrate that that an orchestrated control plane solution can deliver a policy change to enable a security or privacy policy change. In this example such a change can be triggered from the Admin portal 116 to protect in-home/IOT devices across access networks which operate on a variety of differing access technologies. Where the light weight SDN co-controller 105 is configured on the IOT device security and privacy policies can be applied to these devices directly.

This method permits network operators to control and orchestrate network environments using orchestrated and distributed SDN co-controllers 105 operate for both ON-Net and OFF-Net customer environments. By reducing the need for the CPE to be multi-purpose and cheap this allows the operator to focus on acquiring a CPE which delivers premium packet forwarding and control. By enabling the check against multiple 3rd party TIDB 1020/PVIDB 1030 this ensures greater awareness of threats and privacy violations at the earliest moment. As TIDB 1020/PVIDB 1030 are fed with the latest threats and privacy data this ensures that the controls applied, are the most relevant. In addition a cloud controlled solution enables full control for all devices without causing load on the end device and enables the rules for all devices to be applied consistently across all customer premises devices. This approach to security is particularly relevant for IOT as it permits for cloud control of all data coming from the customer premises. Specific flow based forwarding rules can be created for all IOT systems therefore ensuring that even if these devices are hacked that the light weight SDN co-controller 105 does not forward traffic to any other system. This delivers control and enhances protection of the end user from the malicious intent of some organisations and individuals. It supports the consumer in dealing with the complexity of security and privacy issues created across the internet and enables wide spread policy updates to be created when new attack vectors are identified and updated into the TIDB s 1020 and PVIDB s 1030.

Figure 22:
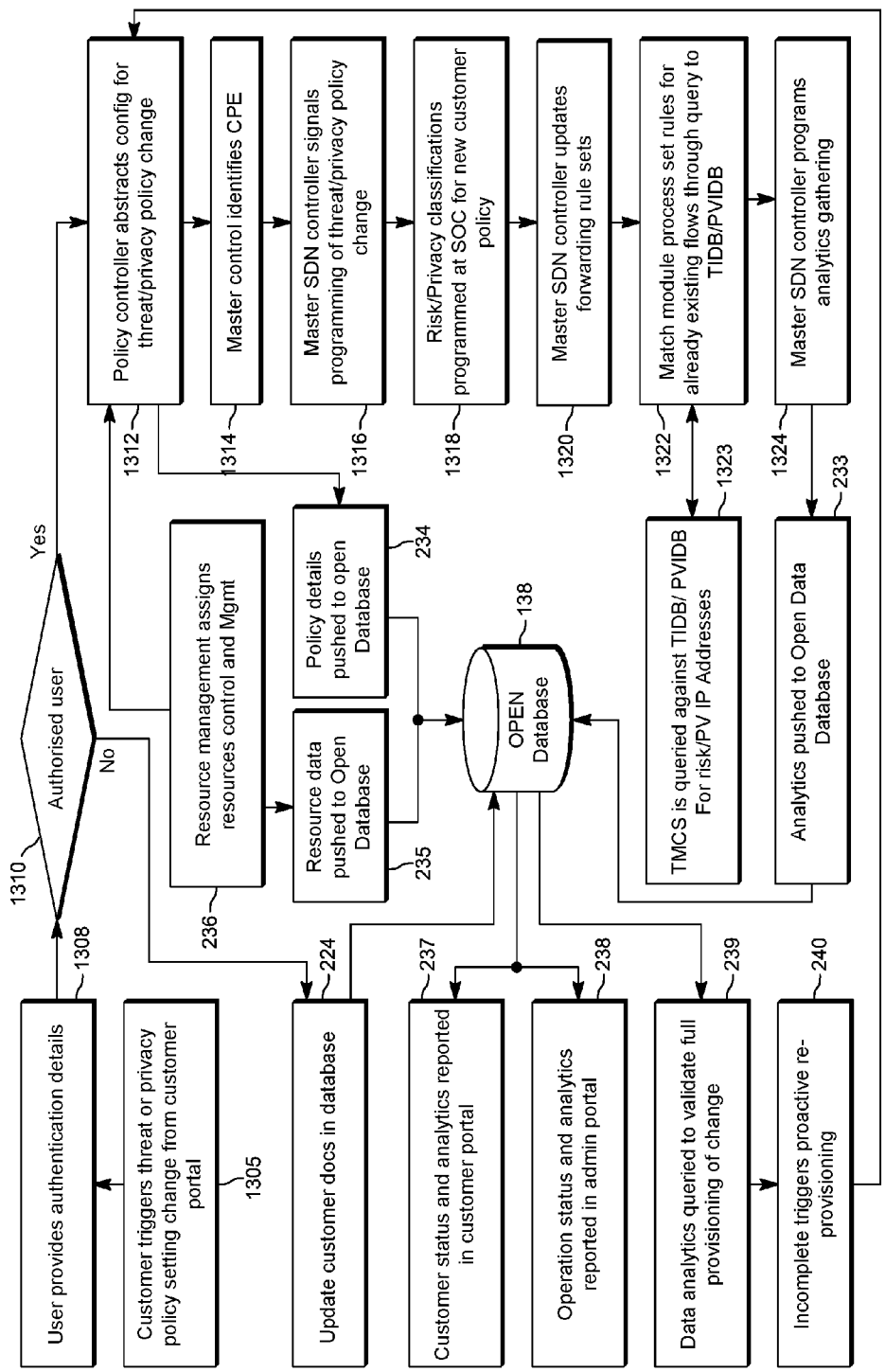
FIG. 22 is a flow diagram illustrating exemplary steps during the operation of the SDN platform of FIG.s 16 or FIGS. 21A and 21B.

Referring to FIG. 22 which illustrates another flowchart showing exemplary steps of the SDN platform in operation which is also in accordance with the present teaching. The flow chart of FIG. 22 is substantially to the flow chart of FIG. 9 and like elements are identified by similar reference numerals. In this exemplary embodiment, a customer triggers a threat or privacy policy settings change from customer portal 118, step 1305. The user provides authentication details via the customer portal 118, step 1308. The user is authenticated by the authentication module, step 1310. The policy controller 135 abstracts configuration data for the threat/privacy policy change, step 1312. The master SDN controller 102 identifies the appropriate device 104, step 1214. The master SDN controller 102 signals programming of the threat/privacy policy change to the SDN co-controller 105, step 1316. The risk/privacy classifications is programmed at the SOC on the CPE 104 for the customer policy by the SDN co-controller 105, step 1318. The master SDN controller 102 updates forwarding rule sets, step 1320. The security match module 1025 processes the set rules for already existing flows by querying the TIDB 1020 and/or PVIDB 1030, step 1322. The security match module 1025 queries the TMCS 1010 queried against TIDB/PVIDB for risky addresses, step 1323. The master SDN controller 102 cooperates with the SDN co-controller 105 to program an analytics gathering module on the CPE 104, step 1324. The SDN co-controller pushes the analytics to the open database 138, step 233. The remaining steps are similar to those previously described with reference to FIG. 9.

The advantages of the present teaching are many. In particular, by moving to a SDN controlled flow forwarding solution this allows for new forwarding look ups from a customer, to be off-line processed against the privacy/security rules defined within the customer setting, using the TMCS 1010. This off-loads the security applications processing from the end device 104 and reduces the processing load on the multiple end CPE 104. Furthermore, this reduces the need to run security applications on the CPE 104, therefore reducing costs. In addition as security applications are no longer required to be loaded onto the CPE 104 this reduces processing and memory resources required by the CPE 104.

Where the SDN controlled CPE solution orchestrates a residential environment, this permits controls to be applied against a user in a granular fashion to ensure that controls can be quickly applied without the need to first rewrite the software and to send out updates and patches to individual systems. An example of one such policy push is that where a BotNet is identified as having been trigger that a policy push is made to any CPE which requests a route to the destination under attack. This ensures that the CPE do not join in the attack. In addition the orchestrated SDN control CPE is then identified as being infected with that particular BotNet. A report is then made to the consumer with a report of the device, its MAC address and other relevant information gathered. They are informed of the infection and told to address it. The same mechanism is used to control infections such as adware or malware etc. where known destinations are held in the TMCS 1010.

When any device within the consumer's environment requests such a destination, the lookup is checked against the TMCS 1010 and where a path is identified or considered to be questionable the flow based forwarding path is not fulfilled until further validation of the requested path is confirmed. The customer is notified of the nature of the possible violation and no forwarding path is installed until the path is fully verified to be safe and when the control system is sure that the route being requested is not something that was generated by an application that could cause a security breach.

This present method utilises a light weight and distributed SDN co-controller 105 that may be installed on any hardware, either through embedding the light weight SDN controller within the firmware or on an open CPE. This light weight SDN controlled solution breaks the proprietary nature of CPE and permits for the solution to be applied and controlled across multiple vendors' CPE solutions. The the light weight SDN co-controller 105 programs the forwarding table of the CPE/consumer device 104 through using a route orchestration component which is either regionalised of centralised. This is used to set a defined list of policy rules generated from either multiple or a single threat database which has been populated with details of identified threats. These policies are communicated using open standard protocols and set within the forwarding rules of the CPE/consumer device or where the volume is to great, they reside in the lookup table of the route orchestration component which is either regionalised of centralised, depending on the scaling of the network. These security initiated forwarding rules, then drop traffic destined to these destinations for the devices that are required to be protected within the premises of the consumer. Not all rules are required to be stored on the device as when a new route is requested form the central route orchestration function and a check can be made to the 3rd party database to validate if the route is infact a non-toxic destination. This could be a route requested via DNS or another other standards based approach e.g. ARP for IPv4.

A person skilled in the art would appreciate that the end devices distributed to consumers do not have the capability to analyse or store the large volumes of data used required for the processing of the complex security rules. This inability to process these complex rules sets and the limitations of on-device based applications restricts the ability of today's applications to better protect the end customer, thus leaving the consumer unprotected and vulnerable. Computing of the full known threat control system data base, or multiple threat control system databases is done off-line. An example of where the threats data base or data bases could be processed is within a cloud environment. These third party databases would contain known data on BOTNETS, ADWARE, DDOS, MALWARE, Privacy Intrusion, firewalling, parental control etc. Multiple matching tupels of data will be identified and forwarding rules set which ensure traffic generated within the home is not sent to destinations on the internet. In addition the threat control system will interface to multiple sources of threats to ensure that it remains up-to-date on the latest security threat incarnations that are taking place on the internet.

In addition where DDOS attacks are being generated to a known destination on the internet flow based control can be used to granularly eliminate the attack flows from the traffic traversing the network. Today destinations under attack tend to have to deal with the attack by taking the site offline or by utilising high end and costly hardware which is difficult to effectively scale. In effect the solutions known heretofore deliver to the attacker the desired effect as the company hosting the site is put under considerable pressure and in many cases has to withdraw the site form visibility on the internet to relieve itself from the attack.

The techniques introduced here can be embodied as special purpose hardware (e.g. circuitry), or as programmable circuitry appropriately programmed with software and/or firmware, or as a combination of special-purpose and programmable circuitry. Hence various embodiments may include a machine-readable medium having stored thereon instructions which may be used to program a computer (or other electronic devices) to perform a process. The machine readable medium may include, but is not limited to, optical disks, compact disk read-only memories (CD-ROMs), and magneto-optical disk, ROMs, erasable programmable read-only memories (EPROMs), electrically erasable programmable read-only memories (EEPROMs), magnetic or optical cards, flash memory, Solid State Drives (SSDs) or other type of media/machine-readable medium suitable for storing electronic instructions.

It will be understood that what has been described herein is an exemplary system for controlling an SDN network. While the present teaching has been described with reference to exemplary arrangements it will be understood that it is not intended to limit the teaching to such arrangements as modifications can be made without departing from the spirit and scope of the present teaching.

It will be understood that while exemplary features of a system in accordance with the present teaching have been described that such an arrangement is not to be construed as limiting the invention to such features. The method of the present teaching may be implemented in software, firmware, hardware, or a combination thereof. In one mode, the method is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. The steps of the method may be implemented by a server or computer in which the software modules reside or partially reside.

Generally, in terms of hardware architecture, such a computer will include, as will be well understood by the person skilled in the art, a processor, memory, and one or more input and/or output (I/0) devices (or peripherals) that are communicatively coupled via a local interface. The local interface can be, for example, but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the other computer components.

The processor(s) may be programmed to perform the functions of the method for controlling an SDN network. The processor(s) is a hardware device for executing software, particularly software stored in memory. Processor(s) can be any custom made or commercially available processor, a primary processing unit (CPU), an auxiliary processor among several processors associated with a computer, a semiconductor based microprocessor (in the form of a microchip or chip set), a macro-processor, or generally any device for executing software instructions.

Memory is associated with processor(s) and can include any one or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor(s).

The software in memory may include one or more separate programs. The separate programs comprise ordered listings of executable instructions for implementing logical functions in order to implement the functions of the modules. In the example of heretofore described, the software in memory includes the one or more components of the method and is executable on a suitable operating system (O/S).

The present disclosure may include components provided as a source program, executable program (object code), script, or any other entity comprising a set of instructions to be performed. When a source program, the program needs to be translated via a compiler, assembler, interpreter, or the like, which may or may not be included within the memory, so as to operate properly in connection with the 0/S. Furthermore, a methodology implemented according to the teaching may be expressed as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

When the method is implemented in software, it should be noted that such software can be stored on any computer readable medium for use by or in connection with any computer related system or method. In the context of this teaching, a computer readable medium is an electronic, magnetic, optical, or other physical device or means that can contain or store a computer program for use by or in connection with a computer related system or method. Such an arrangement can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this disclosure, a "computer-readable medium" can be any means that can store, communicate, propagate, or transport the program for use by or in connection with the instruction execution system, apparatus, or device. The computer readable medium can be for example, but not limited to, an electronic, magnetic, optical, electro-magnetic, infrared, or semiconductor system, apparatus, device, or propagation medium. Any process descriptions or blocks in the Figures, should be understood as representing modules, segments, or portions of code which include one or more executable instructions for implementing specific logical functions or steps in the process, as would be understood by those having ordinary skill in the art.

The above detailed description of embodiments of the disclosure is not intended to be exhaustive nor to limit the disclosure to the exact form disclosed. While specific examples for the disclosure are described above for illustrative purposes, those skilled in the relevant art will recognize various modifications are possible within the scope of the disclosure. For example, while processes and blocks have been demonstrated in a particular order, different implementations may perform routines or employ systems having blocks, in an alternate order, and some processes or blocks may be deleted, supplemented, added, moved, separated, combined, and/or modified to provide different combinations or sub-combinations. Each of these processes or blocks may be implemented in a variety of alternate ways. Also, while processes or blocks are at times shown as being performed in sequence, these processes or blocks may instead be performed or implemented in parallel or may be performed at different times. The results of processes or blocks may be also held in a non-persistent store as a method of increasing throughput and reducing processing requirements.

In general, the terms used in the following claims should not be construed to limit the disclosure to the specific examples disclosed in the specification, unless the above detailed description explicitly defines such terms. Accordingly, the actual scope of the disclosure encompasses not only the disclosed examples, but also all equivalent ways of practicing or implementing the disclosure under the claims.

From the foregoing, it will be appreciated that specific embodiments of the disclosure have been described herein for purposes of illustration, but that various modifications may be made without deviating from the spirit and scope of the disclosure. Accordingly the disclosure is not limited.

We claim:

1. A computer implemented method for providing security on a software defined network (SDN); the method comprising:
    providing a master SDN controller for managing data flow control on the SDN network; the master SDN controller being operable to generate routing data for the networked devices;
    generating by the master SDN controller a plurality of discrete co-controllers each associated with a particular end user; each SDN co-controller including routing data for an associated networked device;
    dispatching the SDN co-controller by the master SDN controller to the networked devices associated with the respective end users for controlling thereof;
    requesting access to a destination on the SDN network from a requesting networked device;
    initiating a domain name system (DNS) interaction with the requesting networked device;
    relaying by the DNS data associated with the requested destination to a threat management control system (TMCS);
    determining by the TMCS if the requested destination has an associated security criteria;
    communicating a threat status by the TMCS to the SDN co-controller associated with the requesting networked device; and
    generating routing data by the SDN co-controller associated with the requesting networked device based on the threat status to allow or deny access to the requested destination.

2. A method as claimed in claim 1; wherein the TMCS is in communication with at least one data repository that contain details of destinations which have predetermined security criteria associated with them.

3. A method as claimed in claim 2; wherein the at least one data repository is updated once a destination becomes known as having a malicious security criteria.

4. A method as claimed in claim 3, wherein the at least one data repository is hosted by a third party entity.

5. A method as claimed in claim 2, wherein the at least one data respository comprises a classification of multiple risk types.

6. A method as claimed in claim 2, wherein the at least one data respository comprises a classification of multiple user profiles.

7. A method as claimed in claim 6, wherein each user profile has an associated routing action based on it's classification.

8. A method as claimed in claim 2; wherein the at least one data respository comprises a first data set associated with destinations having pre-identified security threats.

9. A method as claimed in claim 8; wherein the at least one data repository comprises a second data set associated with destinations that are known to harvest privacy related data from users.

10. A method as claimed in claim 9; wherein the first data set is stored in a first data repository; and the second data set is stored in a second data repository.

11. A method as claimed in claim 1; wherein each SDN co-controlled has an associated security match module which is operable to define an appropriate forwarding decision based on the threat status recieved from the TMCS.

12. A method as claimed in claim 11; wherein the fowarding decision is based on a user profile associated with the requesting networked device.

13. A method as claimed in claim 11; wherein the forwarding decision is based on a risk classification.

14. A method as claimed in claim 11; wherein the forwarding decision results in traffic being sent to a quarantine destination.

15. A method as claimed in claim 11; wherein the forwarding decision results in traffic being forwarded to the requested destination.

16. A method as claimed in claim 11; wherein the SDN co-controlled on the requesting networked device enter a forwarding entry in a flow routing table based on the forwarding decision of security match module.

17. A method as claimed in claim 1; wherein the TMCS is operable to populate an open database accessible by an SDN orchestrator.

18. A method as claimed in claim 17; wherein the TMCS is operable to populate the open database with the status of identified threats.

19. A method as claimed in claim 18; wherein the open database is accessible from at least one remote portal.

20. A method as claimed in claim 19; wherein the status of the identified threats are viewable from the at least one remote portal.

21. A method as claimed in claim 18; wherein the TMCS is operable to relay an IP address of a user; a user profile identifier and a risk classification identifier to the open database.

22. A method as claimed in claim 21; wherein the IP address of the user is used to to map a security alert report to a customer record.

23. A method as claimed in claim 22; wherein the security alert report details actions required to be taken by the user to alleviate the threat.

24. A method as claimed in claim 1; wherein the user selects a security setting from a plurality of available security settings.

25. A method as claimed in claim 24; wherein a security policy is generated based on the selected security setting.

26. A method as claimed in claim 18; wherein an identifier of the requesting networked device is extracted from the open database.

27. A method as claimed in claim 26; wherein a list of commonly used sites by the user are extracted from the open database.

28. A method as claimed in claim 1, further comprising extracting analytical data by the SDN co-controllers from the networked devices.

29. A method as claimed in claim 28, further comprising routing the extracted analytical data to an open database.

30. A method as claimed in claim 29, wherein the extracted analytical data is routed by the SDN co-controllers to the open database via the master SDN controller.

31. A method as claimed in claim 29, further comprising providing an analytics engine in communication with the open database being operable to analyse the extracted analytics to generate an analytics output.

32. A method as claimed in claim 31, wherein the analytics output is accessible via one or more client portals.

33. A method as claimed in claim 32, wherein one or more performance enhancing options are made available to the end user via the client portals for selection based on the analytics output.

34. A method as claimed in claim 33, wherein configuration data is updated in response to the end user selecting one or more performance enhancing options.

35. A method as claimed in claim 31, further comprising updating the installed SDN co-controller with the updated configuration data for modifying operational configuration of the networked devices.

36. A method as claimed in claim 35, wherein the operational configuration of the networked devices are modified to increase a quality of service parameter.

37. A method as claimed in claim 35, wherein the operational settings of the networked devices are updated in real-time while being online.

38. A method as claimed in claim 35, wherein the operational configuration of the networked devices are updated while in a sleep-mode.

39. A method as claimed in claim 1, wherein the SDN co-controllers are installed on a system on chip (SOC) of the respective networked devices.

40. A method as claimed in claim 1, wherein the SDN co-controllers are loaded to firmware contained on the respective networked devices.

41. A method of any preceding claim, wherein the SDN co-controllers are binary deployable.

42. A method as claimed in claim 1, wherein the SDN co-controllers register with the master SDN controller after being installed on the respective networked devices for controlling the routing of data from the networked devices and for controlling the configuration of the networked devices.

43. A network security controller for a software defined network (SDN), the network security controller comprising one or more modules operable to:
  provide a master SDN controller for managing data flow control on the SDN network; the master SDN controller being operable to generate routing data for the networked devices;
  generate by the master SDN controller a plurality of discrete co-controllers each associated with a particular end user; each SDN co-controller including routing data for an associated networked device;
  dispatch the SDN co-controller by the master SDN controller to the networked devices associated with the respective end users for controlling thereof;
  request access to a destination on the SDN network from a requesting networked device;
  initiate a domain name system (DNS) interaction with the requesting networked device;
  relay by the DNS data associated with the requested destination to a threat management control system (TMCS);
  determine by the TMCS if the requested destination has an associated security criteria;

communciate a threat status by the TMCS to the SDN co-controller associated with the requesting networked device; and generate routing data by the SDN co-controller associated with the requesting networked device based on the threat status to allow or deny access to the requested destination.

44. A computer-readable medium comprising non-transitory instructions which, when executed, cause a processor to carry out a method; the method comprising providing a master SDN controller for managing data flow control on the SDN network; the master SDN controller being operable to generate routing data for the networked devices;

generating by the master SDN controller a plurality of discrete co-controllers each associated with a particular end user; each SDN co-controller including routing data for an associated networked device;

dispatching the SDN co-controller by the master SDN controller to the networked devices associated with the respective end users for controlling thereof;

requesting access to a destination on the SDN network from a requesting networked device;

initiating a domain name system (DNS) interaction with the requesting networked device;

relaying by the DNS data associated with the requested destination to a threat management control system (TMCS);

determining by the TMCS if the requested destination has an associated security criteria;

communicating a threat status by the TMCS to the SDN co-controller associated with the requesting networked device; and generating routing data by the SDN co-controller associated with the requesting networked device based on the threat status to allow or deny access to the requested destination.

* * * * *